United States Patent [19]

Israel

[11] Patent Number: 4,583,658

[45] Date of Patent: Apr. 22, 1986

[54] SINGLE NEWSPAPER VENDING MACHINE

[76] Inventor: Benjamin Israel, Meadowbrook Apartments #160, Meadowbrook Dr., Huntingdon Valley, Pa. 19006

[21] Appl. No.: 544,921

[22] Filed: Oct. 24, 1983

[51] Int. Cl.[4] .............................................. B65G 59/02

[52] U.S. Cl. ..................................... 221/213; 221/251

[58] Field of Search ............................... 221/213-216, 221/227, 232, 244, 248, 251; 194/2

[56] References Cited

U.S. PATENT DOCUMENTS 1,886,694 11/1932 Kelly .
3,042,250 7/1962 Watlington .
3,114,475 12/1963 Etes .
3,708,087 1/1973 Schonthal .
3,768,695 10/1973 Pearson .
4,067,477 1/1978 Chalabian .
4,140,242 2/1979 Muller et al. .
4,174,047 11/1979 Owens .

*Primary Examiner*—Stanley H. Tollberg
*Attorney, Agent, or Firm*—Seidel, Gonda, Goldhammer & Abbott

[57] ABSTRACT

A single newspaper vending machine comprises a cabinet and a gate unit, a paper support unit, and a paper display unit, each removably mounted on the cabinet. Newspapers are stacked on a spring loaded elevator within the cabinet. The gate unit is mounted at the top of the cabinet and includes a dispensing mechanism which is reciprocable between rear and forward positions for partially dispensing a top paper on the elevator to the paper support unit so that the front edge of the paper enters a paper access zone between the gate unit and the paper support unit. A coin mechanism operates a dispensing mechanism latch so as to lock the dispensing mechanism in the rear position until the proper amount of coins has been inserted. The gate unit also includes a blocking mechanism for preventing withdrawal of any paper from the elevator when the dispensing mechanism is in the rear position and for preventing withdrawal of a second paper from the elevator when the dispensing mechanism is in the forward position. The paper support and paper display units are arrranged in telescoping relation, and the paper support unit is movable relative to the paper display unit by a calibrated adjustment mechanism so as to adjust the height of the paper access zone according to the thickness of the newspaper being dispensed.

24 Claims, 26 Drawing Figures

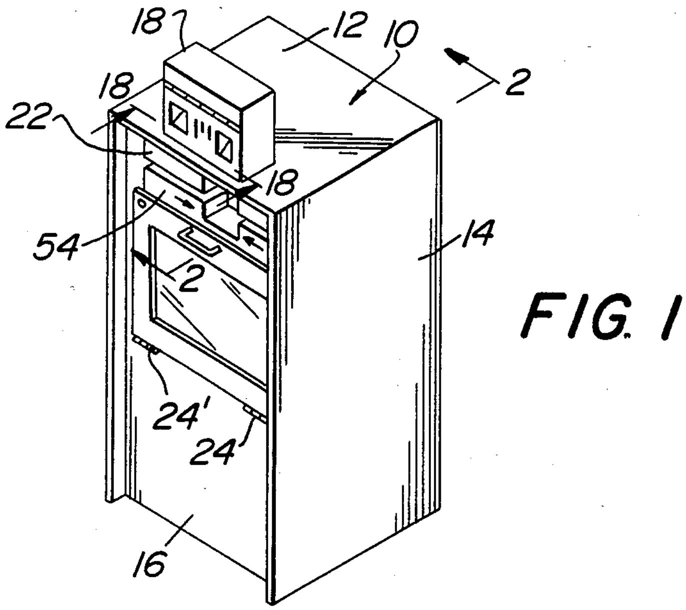
FIG. 1
FIG. 5
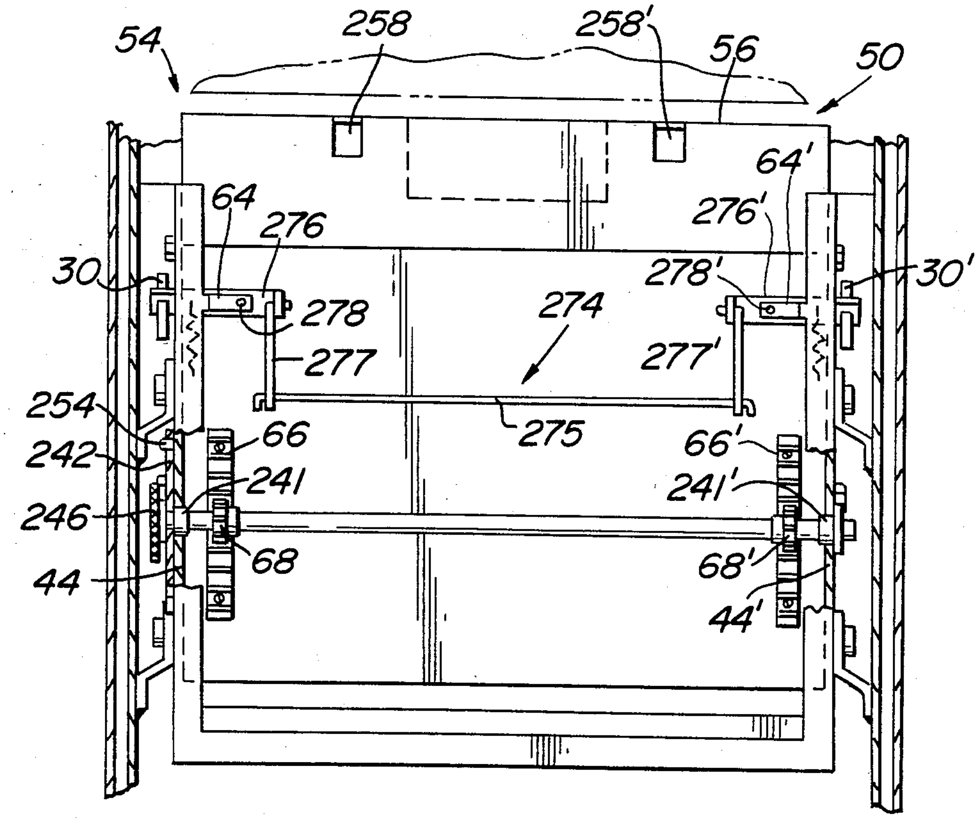

FIG. 7D
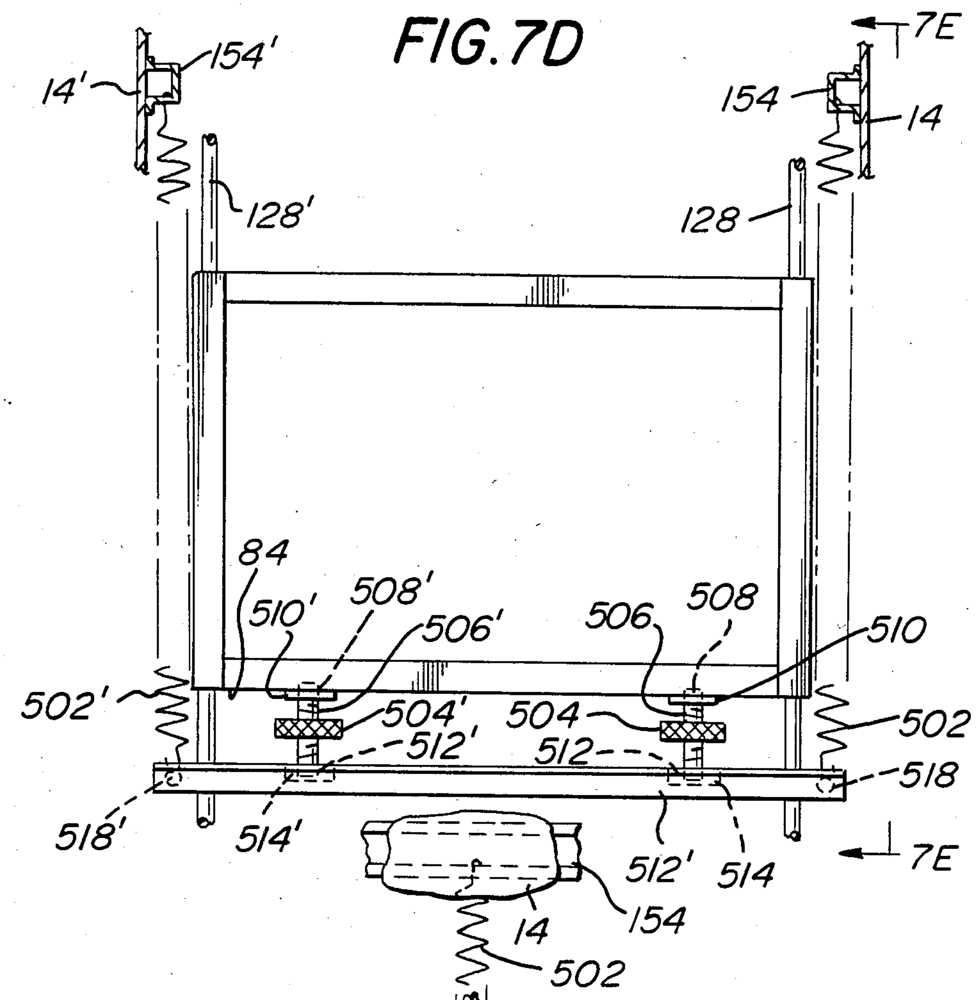
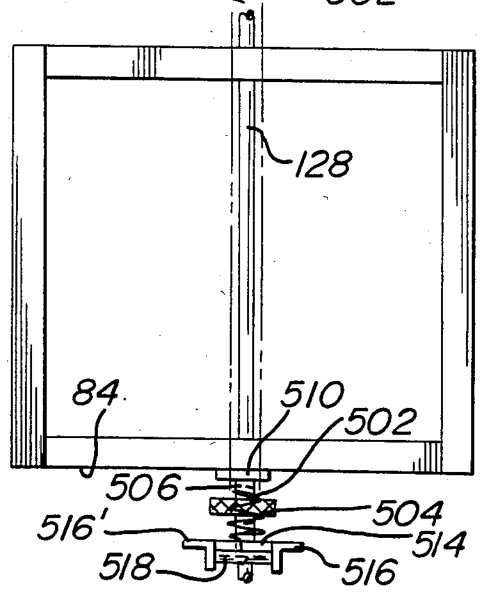
FIG. 7E

FIG. 15
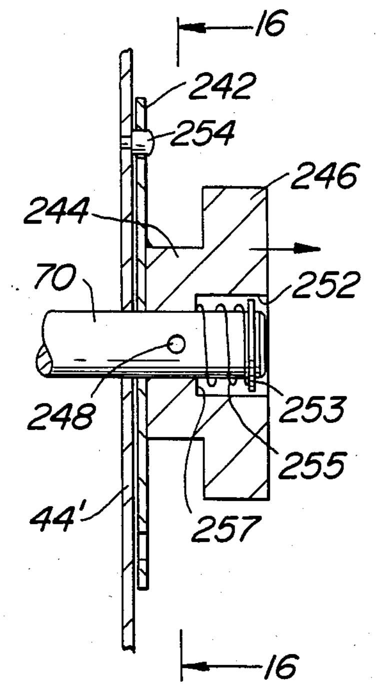
FIG. 16
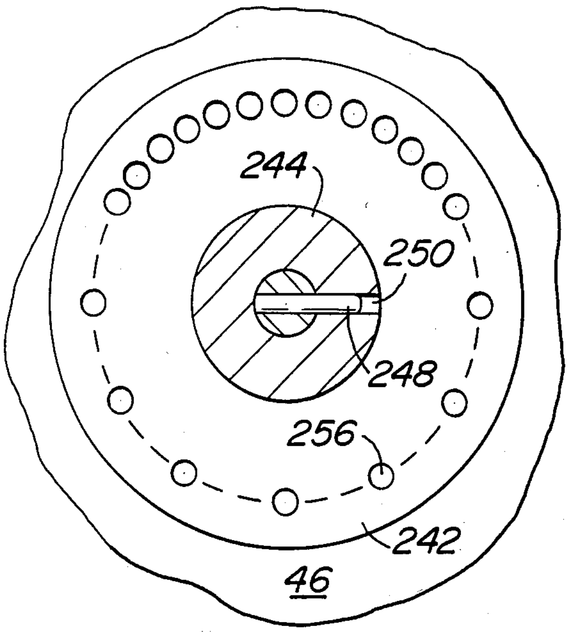
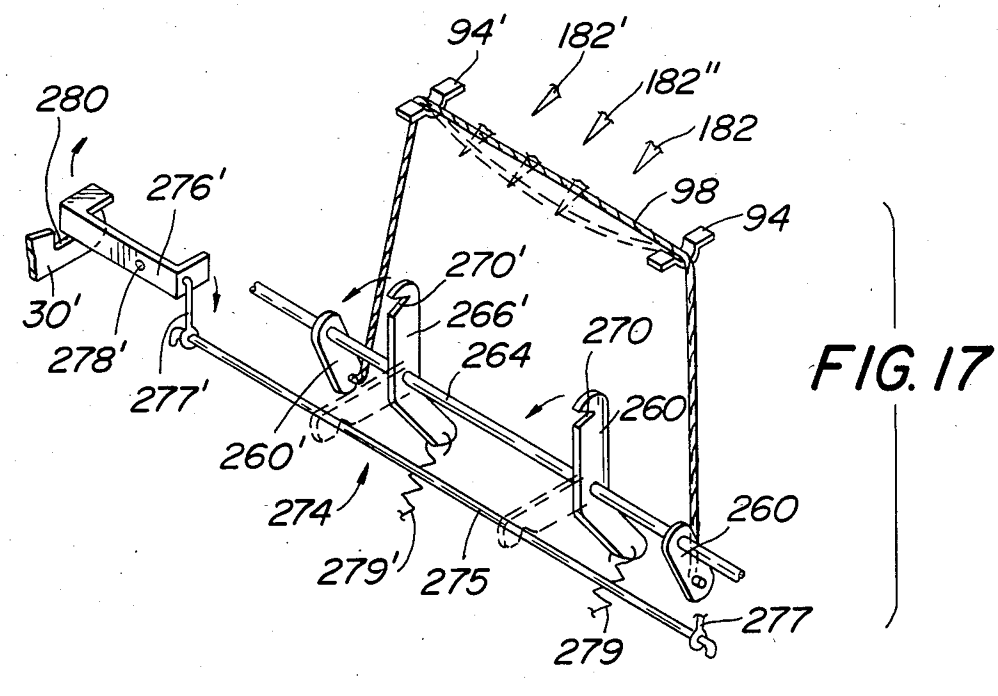
FIG. 17

FIG. 18
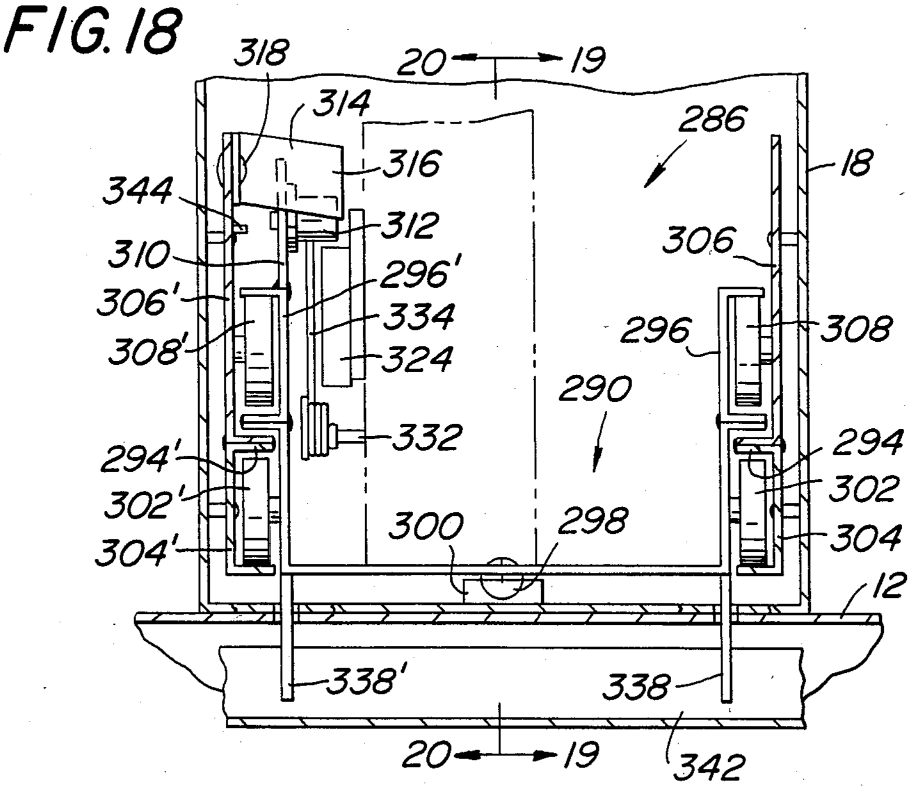
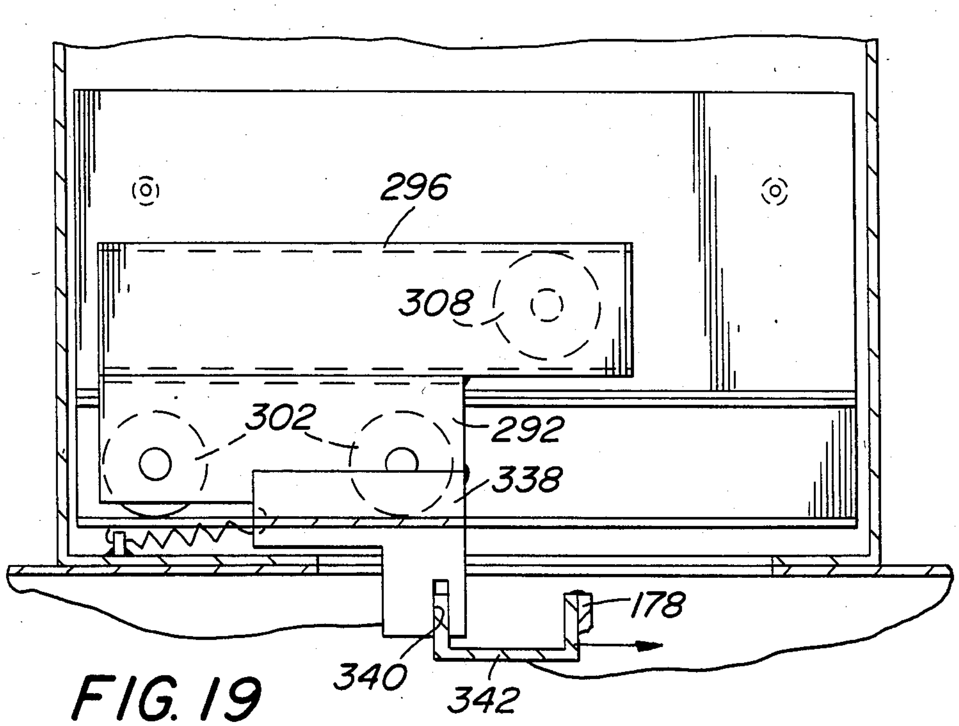
FIG. 19

SINGLE NEWSPAPER VENDING MACHINE

BACKGROUND OF THE INVENTION

The present invention is directed to a single newspaper vending machine. In particular, the invention is directed to a single newspaper vending machine comprising a cabinet, a gate unit, a paper support unit, and a paper display unit, the units being removably mounted on the cabinet. When the units are in place, the vending machine is operated to dispense a single newspaper at a time. When the units are removed, the vending machine may be operated as a conventional "honor" machine wherein the coin mechanism and front door operate to provide access to the entire stack of newspapers stored in the machine.

Single newspaper vending machines per se are not new. Such machines are, for example, described in U.S. Pat. Nos. 4,140,242 (Muller et al)' and 3,768,695 (Pearson). In the Muller et al patent, a front hinged door 34 is unlatched by a coin release mechanism to provide access to the newspapers. When the door is unlatched, a newspaper dispensing device 90 becomes visible. A spring-loaded magazine located behind the device 90 brings the stack of newspapers to the level of a withdrawal gate 96. When the door 34 is closed, lever 68 displaces a projection 84 so as to trip and release a lever 146. The lever 146 is part of a mechanism that otherwise blocks the withdrawal gate 96. An adjustment mechanism 94, shown in FIG. 5 of the patent, adjusts the height of a lower section 106 of the withdrawal gate, the upper section being part of the machine frame and being stationary. The lower section is provided with a pocket 112 for accomodating the user's hand. Withdrawal of a newspaper rotates separate shaft-mounted levers 116, 118 forwardly. The lever 116 is arrested in the forward position by a lever 126 which moves over and rests on a stop 130. The lever 118 then swings back to its original position, displacing a blocking lever 120 which is then spring-urged back to its original position so as to block the lever 118 from further forward displacement. When the hinged door 134 is closed, lever 68 causes displacement of lever 146 and the lever 124 on which stop 130 is mounted, thereby freeing lever 126 so that lever 116 can rotate back to vertical. A paddle on lever 116 displaces the blocking lever 120, freeing lever 118 for subsequent operation.

The Pearson patent discloses a top loading machine of the type described in the Muller et al patent. A narrow front access door 14 is locked and unlocked by a coin mechanism. The door 14 is swung open to gain access to the newspapers. A newspaper is withdrawn through a space between upper and lower gate sections 19, 20. The lower gate section 20 is secured to a plate 25 which is vertically reciprocable in channels 26, 27 by means of a suspension cable 21 wound around an adjustment shaft 22 mounted on the top gate section 19. Newspapers are bulk loaded on a stack carrier 18 which is supported by a cable system as shown in FIG. 3. The suspension system is responsive to opening and closing of the front access door. When the access door is open, a pawl 30 swings forward as a newspaper is withdrawn. After the newspaper is withdrawn, while the door is still open, the pawl 30 returns to its original position and the lever 51 engages and locks the shaft on which the pawl is mounted so as to lock the pawl in position and block withdrawal of the next newspaper. When the door is closed, a finger 14L rotates lever 51 so as to release the pawl shaft. In a second embodiment of the machine, shown in FIG. 7 of the patent, the access door 14 is removed. The dispensing mechanism in this embodiment comprises a fixed gate section 80 and an adjustable gate section 81. The mechanism includes a bail coupled to a shaft 83 journaled in the machine frame. A pawl 82 depends from the shaft and is locked in position after removal of the newspaper by a linkage assembly including a toggle 90 which is controlled by the coin mechanism.

Vending machines wherein newspapers are dispensed by semi-automatic operation are also known. For example, in U.S. Pat. No. 3,042,250 (Watlington) there is disclosed a vending machine provided with a bridge 25 and a shaft 27 on which sharpened fingers 33 are located. See FIGS. 2 and 5. The bridge is dispaceable by the operator using an actuator mechanism having a handle 41. During forward movement of the bridge, the fingers engage the top newspaper in a stack and move it to a discharge slot. The stack platform coacts with vertical racks 16 and ratchet wheels 58. Similarly, U.S. Pat. No. 3,114,475 (Etes) discloses a vending machine capable of semi-automatic operation wherein a finger 36, which is mounted on a reciprocable carriage, impales the top paper in a stack and displaces the paper to a discharge slot.

Newspaper dispensing machines employing slidable dispensing mechanisms are also known, as disclosed for example in U.S. Pat. Nos. 1,886,694 (Kelly) and 3,708,087 (Schonthal). In the Kelly patent, an automatic dispensing operation is followed by manual withdrawal of the newspaper. A frame A is displacable together with an operating head 42 (within which a coin control mechanism is located) with respect to a discharge slot 11. See FIG. 3. The frame is provided with rollers 34 which rotate when head 42 is retracted by the operator so as to feed a paper to slot 11. The paper is then grasped and withdrawn by the operator.

Conversion of a semi-honor dispensing machine to a single copy machine is disclosed in U.S. Pat. No. 4,174,047 (Owens). A release mechanism 36 includes a slide plate 38 displacable through a slot 29. The plate 38 is spring-coupled to a coin mechanism pushrod 23. A jaw 53 is mounted below the plate 38 to grip the forward edge of a paper. The mechanism 36 is pulled forward, bringing a newspaper with it, and the paper is then grasped and withdrawn by the operator.

A single paper vending machine wherein locking mechanisms are moved into and out of the newspaper path is also known as disclosed in U.S. Pat. No. 4,067,477 (Chalabian).

Presently, there is a need for a modular construction which facilitates conversion of a "honor" system vending machine (wherein a coin mechanism releases a front door so as to provide access to the entire stack of newspapers) to a single newspaper vending machine (whereon a coin mechanism releases a dispensing mechanism to dispense only one paper at a time) with minimal assembly procedures. In addition, there is a need for a single paper vending machine wherein the height of the paper access zone is easily adjusted by a calibrated adjustment mechanism to accomodate a range of newspaper thicknesses. Further, there is a need for a single paper vending machine having the foregoing features wherein the machine front door remains locked throughout the dispensing operation and is automatically released only when the newspaper stack has been exhausted so as to permit access to a last, display newspaper.

An object of the present invention is to provide a modular assembly for rapidly and conveniently converting an "honor" system vending machine to a single newspaper vending machine.

Another object of the invention is to provide a modular gate unit which partially dispenses a newspaper from a paper stack to a paper access zone for subsequent withdrawal by the customers.

Another object of the invention is to provide a gate unit and a movable paper support unit which define a paper access zone having an adjustable height, and a calibrated mechanism for easily adjusting the height of the access zone.

A further object of the invention is to provide a single newspaper vending machine wherein a display newspaper is located behind the front door and wherein the front door is locked throughout the dispensing operation, so as to secure the newspapers stored in the machine from access to the customer, and is automatically released only when the paper stack has been exhausted so as to permit access to the last, display newspaper.

Other objects and advantages appear hereinafter.

BRIEF SUMMARY OF THE INVENTION

Single paper vending machine comprising a spring-loaded paper elevator, a gate unit mounted above the paper elevator including a dispensing mechanism reciprocable between rear and forward positions for partially dispensing a top paper on the elevator towards a paper access zone located below the gate unit and forwardly of the paper elevator and a blocking mechanism for preventing withdrawal of a top paper on the elevator when the dispensing mechanism is in the rear position and withdrawal of a second paper when the dispensing mechanism is in the forward position, a paper support unit and a paper display unit arranged in telescoping relation forwardly of the paper elevator and below the gate unit so as to define the paper access zone, the paper support unit being movable relative to the paper display unit by a calibrated adjustment mechanism so as to adjust the height of the paper access zone according to the thickness of the paper being dispensed.

For the purpose of illustrating the invention, there is shown in the drawings a form which is presently preferred; is being understood, however, that this invention is not limited to the precise arrangements and instrumentalities shown.

BRIEF DESCRIPTION OF THE DRAWINGS

FIG. 1 is a perspective of the cabinet exterior of the single newspaper vending machine of the present invention.

FIG. 5 is a partial rear section taken along 5—5 in FIG. 2.

FIG. 7D is a front elevation of the paper elevator taken along 7D—7D in FIG. 7C.

FIG. 7E is a side elevation of the paper elevator taken along 7E—7E in FIG. 7D.

FIG. 15 is a section of the calibrated adjustment mechanism taken along 15—15 in FIG. 2.

FIG. 16 is a section taken along 16—16 in FIG. 15.

FIG. 17 is an enlarged perspective of the mechanism for locking and unlocking the front door.

FIG. 18 is a front section of the coin mechanism and dispensing unit latch taken along 18—18 in FIG. 1.

FIG. 19 is a side section taken along 19—19 in FIG. 18.

DETAILED DESCRIPTION OF THE INVENTION

Figure 2:
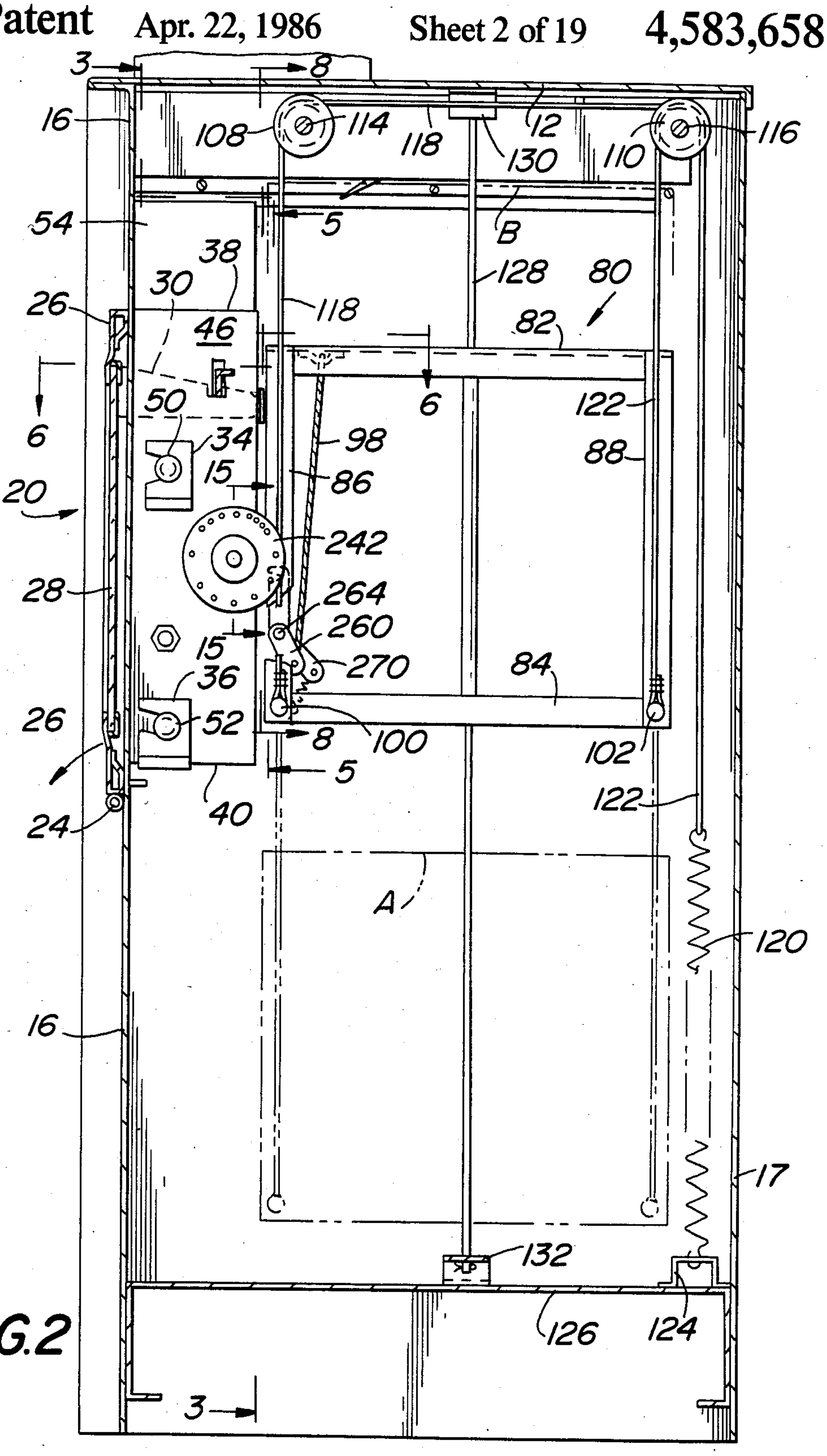
FIG. 2 is a side section taken along 2—2 in FIG. 1.

Referring to the drawings, wherein like numerals indicate like elements, there is shown in FIG. 1 a single paper vending machine according to the present invention designated generally as 10. The vending machine 10 includes a cabinet having a top wall 12, side walls 14 and 14' (hidden), a front wall 16, and a rear wall 17 (hidden). A coin mechanism box 18 is mounted on the top wall 12. A swingable front door 20 is mounted by spring loaded hinges 24, 24' on the front wall 16. A gate unit 22, described in detail hereinafter, is mounted on the cabinet below the top wall 12.

The front door 20 includes a frame 26 within which a transparent panel 28 (glass or other suitable material) is fitted in conventional manner. See FIG. 2. A pair of rearwardly extending latches 30, 30' (FIG. 6) are secured to the door frame for purposes described hereinafter. Like pairs of mounting brackets 34, 36 (FIG. 2) and 34' (FIG. 6), 36' (hidden) are mounted at like locations on the interior of opposing cabinet side walls 14, 14'. A box-shaped paper display unit 38 having a bottom wall 40 and side walls 44, 44' is removably mounted as described hereinafter on the side wall mounting brackets 34, 36 and 34', 36'. See FIGS. 6 and 7A. The display unit 38 is open at the top, front and rear.

The display unit side wall 44 is provided with a pair of outwardly extending spaced trunions 50, 52 which nest in slots formed in the mounting brackets 34, 36 respectively. Trunion 50 has double lug portions for purposes described hereinafter. Like trunions 50', 52' are mounted at like locations on the opposing display unit side wall 44' and nest in the cabinet brackets 34', 36'. The interior of the paper display unit houses a newspaper (not shown) in an upright position which is visible behind panel 28. The newspaper is displayed to show the edition being dispensed. As described more fully hereinafter, the newspaper is also the last paper available for purchase when the store of papers within the machine has been depleted.

The paper display unit 38 may be conveniently removed from the cabinet to convert the machine to a "honor" system machine by swinging the door downwardly about the axes of hinges 24' 24' to the open position, pivoting the paper display unit 38 about the imaginary longitudinal axes connecting trunions 52, 52' so as to disengage trunions 50, 50' from brackets 34, 34', and by sliding the unit up and to the front of the machine so as to disengage trunions 52, 52' from brackets 36, 36'. With the display paper unit 38 is removed, the user has access to the entire store of newspapers within the machine when the front door 20 is opened.

Figure 6:
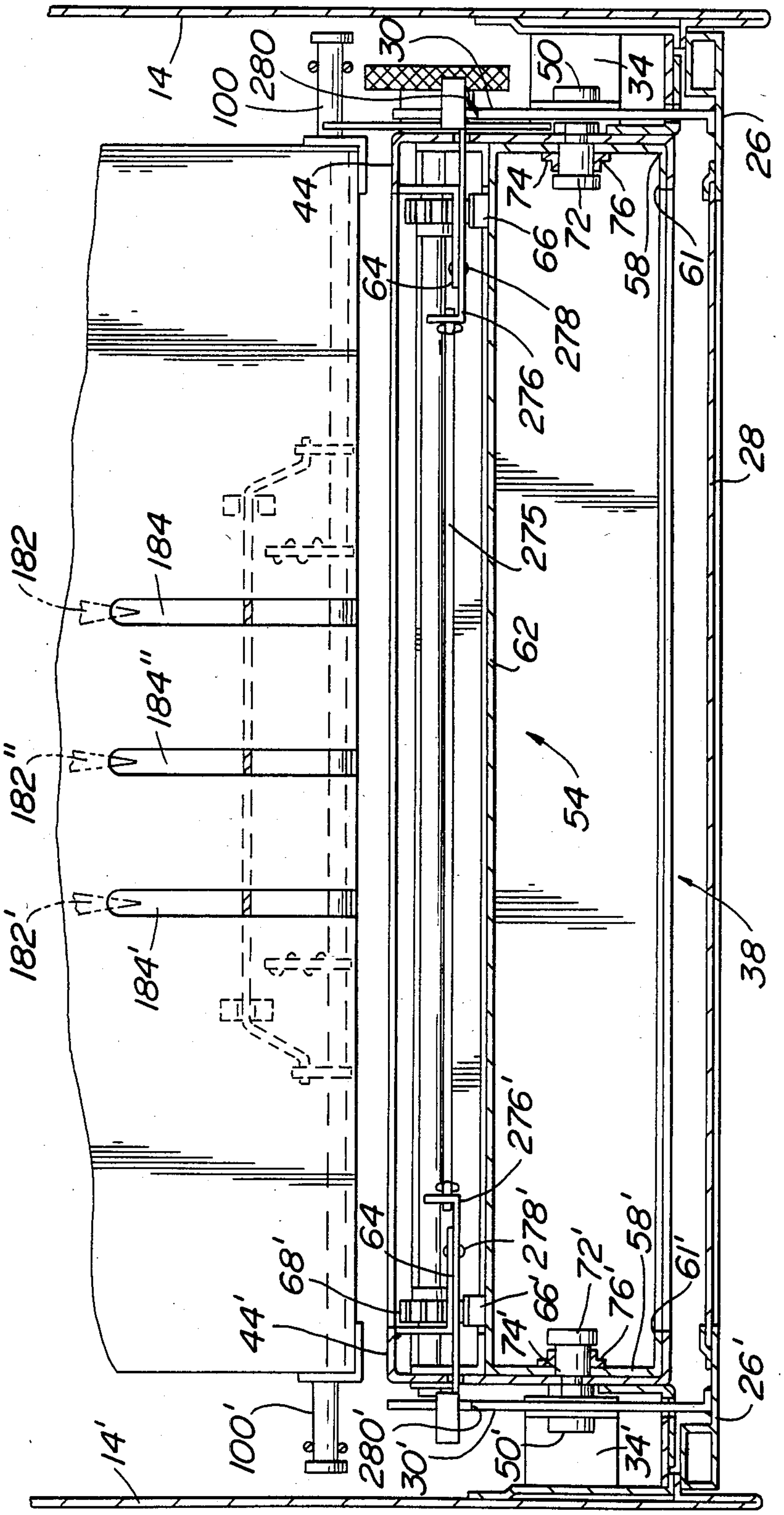
FIG. 6 is a partial top plan taken along 6—6 in FIG. 2.
Figure 7A:
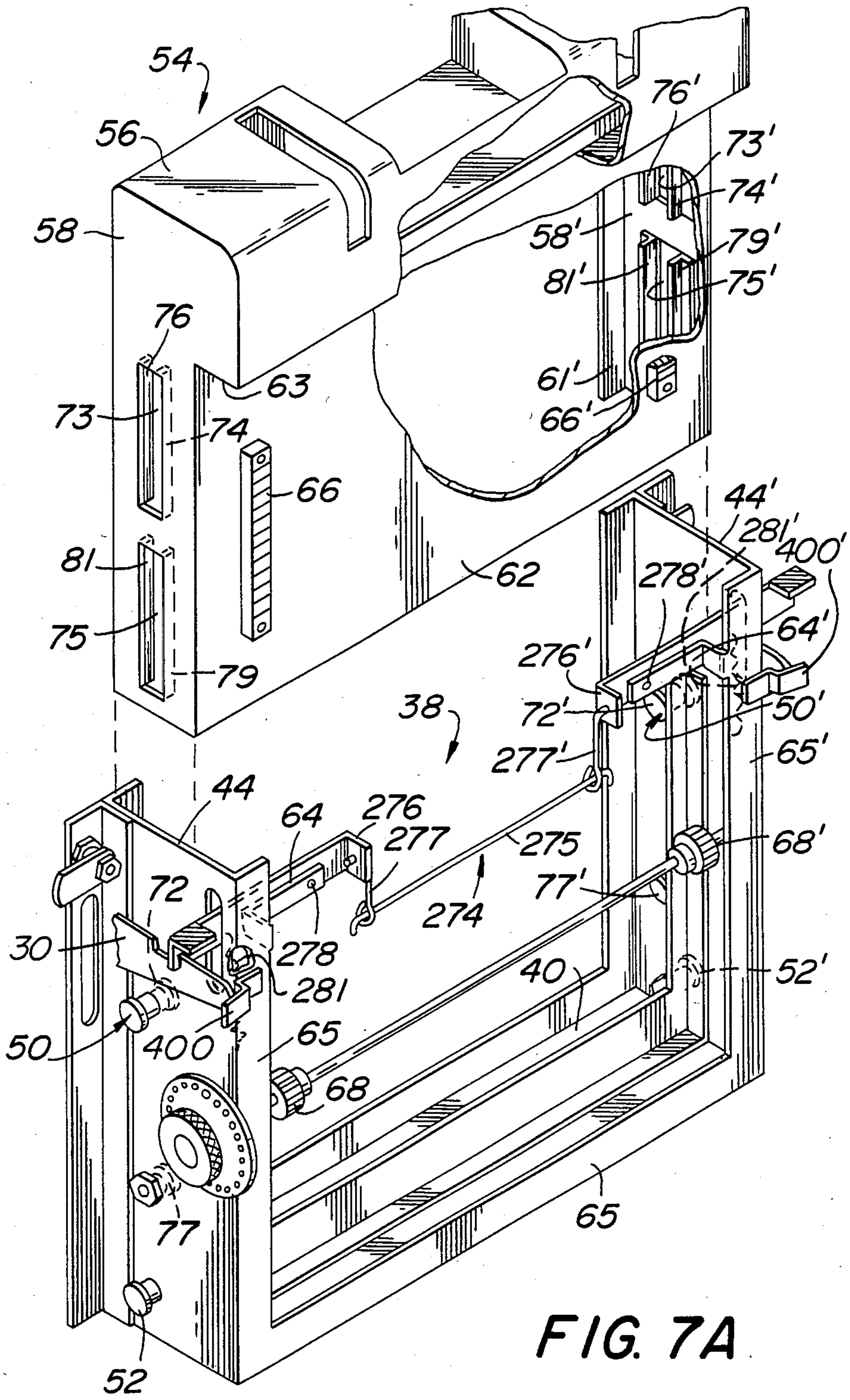
FIG. 7A is an exploded rear perspective showing of the telescoping relation between the paper support unit and the paper display unit.

A movable paper support unit 54 is mounted in telescoping relation within the paper display unit 38. Details of the movable paper support unit 54 are best shown in FIGS. 5, 6 and 7A. The movable paper support unit includes a top wall 56, side walls 58, 58', a partial front wall 61 in the shape of side and top flanges, a rear wall 62, a horizontal shelf 63 and an open bottom. The rear wall 62 bears the legend "Sold Out" (by painting or other suitable application). A pair of racks 66, 66' are mounted on the rear wall 62. The racks are in meshing engagement with pinions 68, 68' which are secured to a shaft 70 journaled at its ends in the display unit side walls 44, 44'. The shaft 70 is rotated by a calibrated, spring-biased adjustment mechanism (described hereinafter) so as to cause the pinions 68, 68' to displace racks 66, 66' and, therefore, the movable paper support unit 54.

The double ended trunions 50, 50' are secured to the display unit side walls 44, 44' and have inwardly extending lug portions 72, 72'. The lug portions 72, 72' pass through guide channels in the movable paper support unit formed by elongated slots 73, 73' and pairs of facing brackets 74, 76 and 74', 76'. Single ended trunions 77, 77' are likewise secured to the display unit side walls and have inwardly extending lug portions which pass through guide channels in the movable paper support unit formed by elongated slots 75, 75' and pairs of facing brackets 79, 81 and 79, 81'.

The newspapers are stored on a paper elevator 80 best shown in FIGS. 2–4 and 7B. The paper elevator 80 is provided with a top wall 82 and a bottom wall 84 which are connected at their corners by four upright struts or braces 86, 88 and 90, 92. A pair of brackets 94, 94' are secured to the underside of top wall 82 so as to provide a support for a flexible stranded wire 98 (described in greater detail hereinafter in connection with the front door release mechanism). Two front trunions 100, 100', and two rear trunions 102, 102' are secured by suitable means to the elevator bottom wall 84. The trunions serve as anchors for pulley cables as described hereinafter.

On one side of the elevator 80, there are located three pulley wheels 108, 110, 112, and on the other side there are located three pulley wheels 108', 110', and 112'. See FIGS. 2–4. Pulley wheels 108, 108' are mounted on stub shafts 114, 114' which are secured to the cabinet side walls 14, 14'. Pulley wheels 110, 112 are mounted on a stub shaft 116 which is secured to cabinet side wall 14. Pulley wheels 110', 112' are mounted on a stub shaft 116' which is secured to the cabinet side wall 14'. A pulley cable 118 is secured to trunion 100 and is partially wound on pulley wheels 108 and 110. The cable 118 is secured to the end of a helical spring 120. A pulley cable 122 is secured to the trunion 102 and partially wound on pulley wheel 112. The end of the cable 122 is secured to the same helical spring 120. The helical spring 120 is anchored in a bracket 124 secured to a shelf 126 fastened to the cabinet front wall 16 and rear wall 17.

Figure 3:
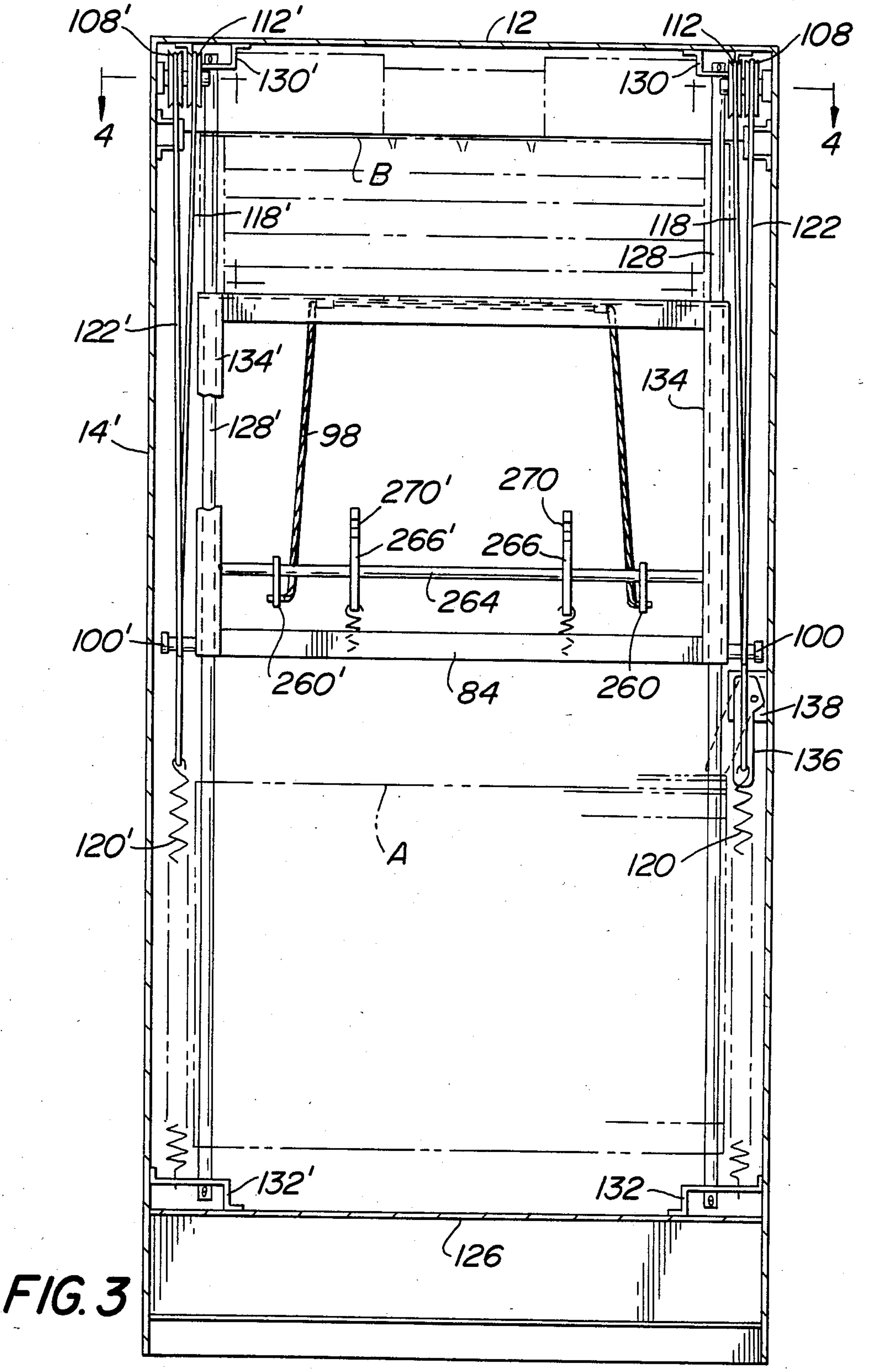
FIG. 3 is a front section taken along 3—3 in FIG. 2.
Figure 4:
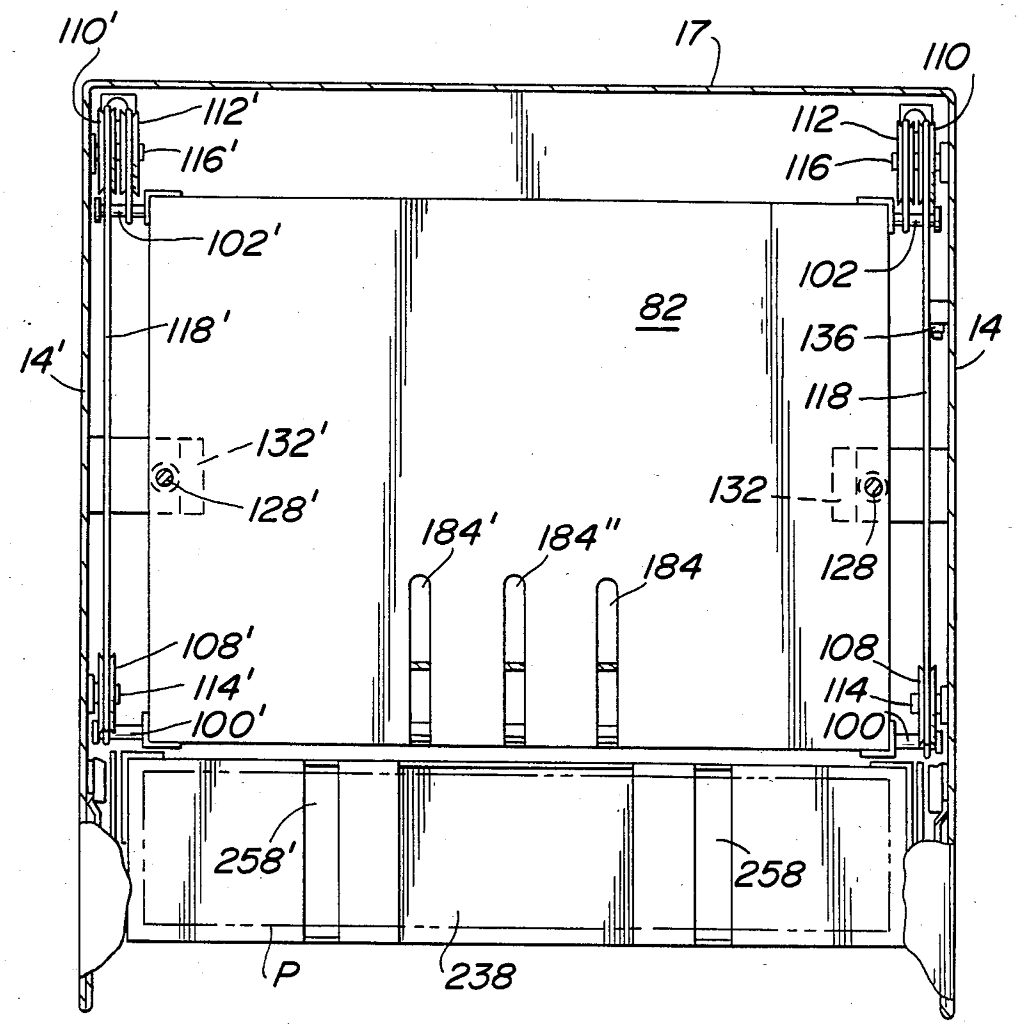
FIG. 4 is a top plan taken along 4—4 in FIG. 3.

Similarly, a pulley cable 118' is secured to trunion 100' and is partially wound on pulley wheels 108' and 110' (FIG. 4). The pulley cable 118' is secured to the end of a helical spring 120' (FIG. 3). A pulley cable 122' is secured to the trunion 102' and is partially wound on pulley wheel 112'. The pulley cable 122' is secured to the end of the same helical spring 120'. Thus, on each side of the paper elevator 80, the forward trunion 100 (100') and the rear trunion 102 (102') are connected by separate pulley cables to a common helical spring 120 (120'). Accordingly, the paper elevator 80 is spring-urged upwardly with optimal distribution of the spring forces through the pulley cables. If desired, a turnbuckle (not shown) may be interposed along cable 118 between pulley 110 and spring 120 to facilitate adjustment of the length of the cable and thereby equalize the tension on cable 118 and 122. Similarly, a turnbuckle may be interposed along cable 118' between pulley 110' and spring 120' to facilitate adjustment of the length of the cable and thereby equalize the tension on cables 118' and 122'.

The paper elevator 80 is slidably mounted on a pair of guide rods 128, 128'. See FIGS. 3 and 7B. Guide rod 128 is secured to a mounting bracket 130 which is fastened to the underside of the cabinet top wall 12. The guide rod is also secured to a mounting bracket 132 which is fastened to the cabinet shelf 126. The guide rod 128' is secured to a mounting bracket 130' which is fastened to the underside of cabinet top wall 12. The guide rod 128' is also secured to a mounting bracket 132' which is fastened to the cabinet shelf 126. The guide rods 128, 128' extend through associated aligned openings in the elevator top and bottom walls 82, 84. A sleeve 134 surrounds guide rod 128 between the elevator top and bottom walls 82, 84. Similarly, a sleeve 134' surrounds guide rod 128' between the elevator top and bottom walls. Sleeves 134, 134' are secured at their ends to the elevator top and bottom walls, such as by welding. The guide rods ensure a smooth displacement of the paper elevator 80 during loading and subsequent operation of the elevator.

To load the elevator 80, the delivery man places his hand on the topside of elevator bottom wall 84 and pushes the elevator downwardly to the broken line position designated A in FIGS. 2 and 3. To retain the elevator 80 in the lowermost position, the delivery man swings a pivotable finger 136, mounted by a pivot pin 137 on a bracket 138 secured to the cabinet side wall 14, so that the end of the finger contacts the elevator top wall 82 as shown in phantom in FIG. 3. In this position, the enlarged rear portion of the finger contacts the cabinet side wall 14 so that the finger is arrested. This prevents the elevator from being displaced upwardly by the springs 120, 120'. The delivery man then stacks the newspapers on the top side of the elevator top wall 82 and then swings the finger 136 back to the position shown in solid lines in FIG. 3. Springs 120, 120' then pull the ends of cables 118, 122 and 118', 122' downwardly so as to raise the elevator 80 with the newspapers stacked thereon. The elevator 80 will rise until the top paper on the stack contacts the underside of hold-down rollers, described hereinafter, in the gate unit 22.

After each withdrawal of a newspaper from the stack, the springs 120, 120' pull the elevator 80 upwardly so that the next paper contacts the hold-down rollers. When the last paper in the stack is withdrawn, the elevator assumes the position B shown in broken lines in FIGS. 2 and 3.

Figure 7B:
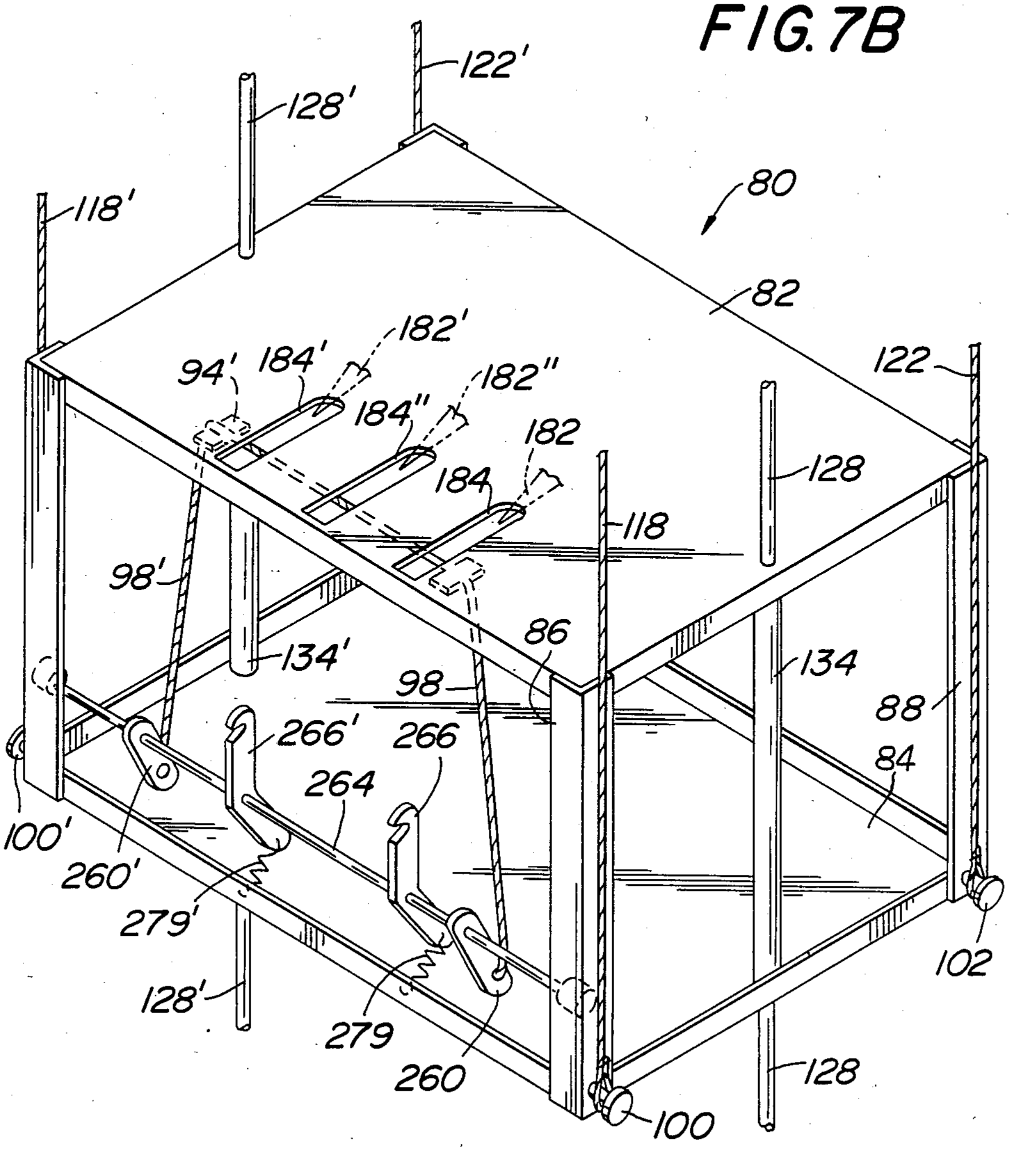
FIG. 7B is a perspective of the paper elevator.
Figure 7C:
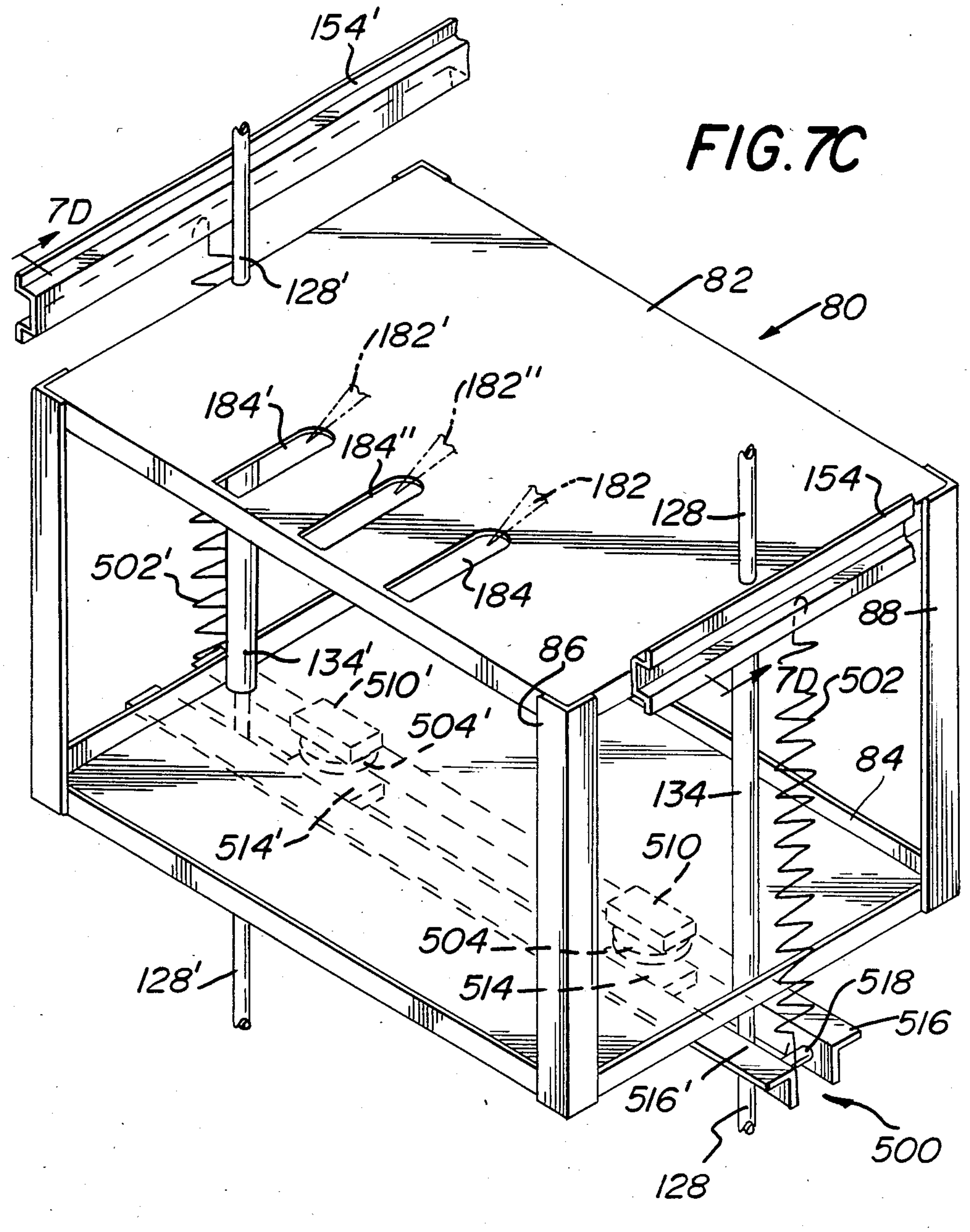
FIG. 7C is a perspective of an alternate embodiment of the paper elevator.

Referring to FIGS. 7C–7E, there is shown an alternate embodiment of the paper elevator 80 wherein the cable and pulley system shown in FIGS. 2 and 3 has been replaced by a height adjustment mechanism 500 and wherein the springs 120, 120' have been replaced by springs 502, 502'. The height adjustment mechanism 500 includes a pair of disc-shaped, knurled adjustment knobs 504, 504' which are securely mounted on threaded rods 506, 506' respectively for rotation therewith. Rods 506, 506' are threaded in like manner. The upper ends of rods 506, 506' are threaded in threaded recesses 508, 508' formed in blocks 510, 510'. The blocks 510, 510' are secured by welding or the like to the underside of the elevator bottom wall 84. The bottom ends of rods 506, 506' are threaded in threaded recesses 512, 512' formed in blocks 514, 514' respectively. The blocks 514, 514' are positioned between and secured by welding or the like to facing angle brackets 516, 516'. The recesses 508, 508' are threaded in like direction, as are the recesses 512, 512'. Recesses 508, 508' are, however, threaded oppositely with respect to recesses 508, 508'.

The angle brackets are suspended on the threaded rods 506, 506' and spaced in elevation from the underside of the elevator bottom wall, and they are spaced horizontally from each other by the blocks 514, 514'. A pair of rods 518, 518' are secured by welding or the like to the angle brackets 516, 516' near opposite ends of the angle brackets. Spring 502 is anchored at one end on rod 518, and spring 502' is anchored at one end on rod 518'. Spring 502 is anchored at its other end on the hat-shaped cabinet bracket 154, and spring 502' is anchored at its other end on hat-shaped cabinet bracket 154'.

Springs 502, 502' are chosen so that the initial tension of each spring, due to extension when elevator 80 is unloaded in the uppermost or "empty" position pressing against the rollers 162 (position B in FIG. 2), provides a desired residual upward force on the elevator. When the elevator 80 thereafter is loaded with newspapers, each spring extends to accomodate the additional weight placed on the elevator, and the elevator drops accordingly. For each position of the elevator under load, the residual upward force provides a positive contact between the fingers 182, 182', 182" and the top newspapers on the stack.

To equalize the initial tensions on the springs 502, 502' when the elevator 80 is fixed in the uppermost or "empty" position, the operator rotates either or both knobs 504, 504' in the same or opposite directions. Depending on the direction of rotation of knob 504 (504'), the associated rod 506 (506') either advances in recesses 508 (508') and 512 (512') or recedes from recesses 508 (508') and 512 (512'). When rod 506 (506') advances in recesses 508 (508') and 512 (512'), the associated ends of the angle brackets are moved closer to the elevator so that the spring associated with those ends retracts. When the rod 506 (506') recedes in recesses 508 (508') and 512 (512'), the associated ends of the angle brackets are moved farther from the elevator so that the spring 502, (502') associated with those ends extends. Thus, the adjustment mechanism 500 is used when the elevator is fixed in the uppermost or "empty" position to alter the tension on spring 502 (502') such that the tensions on both springs are the same and produce the desired residual force.

Figure 8:
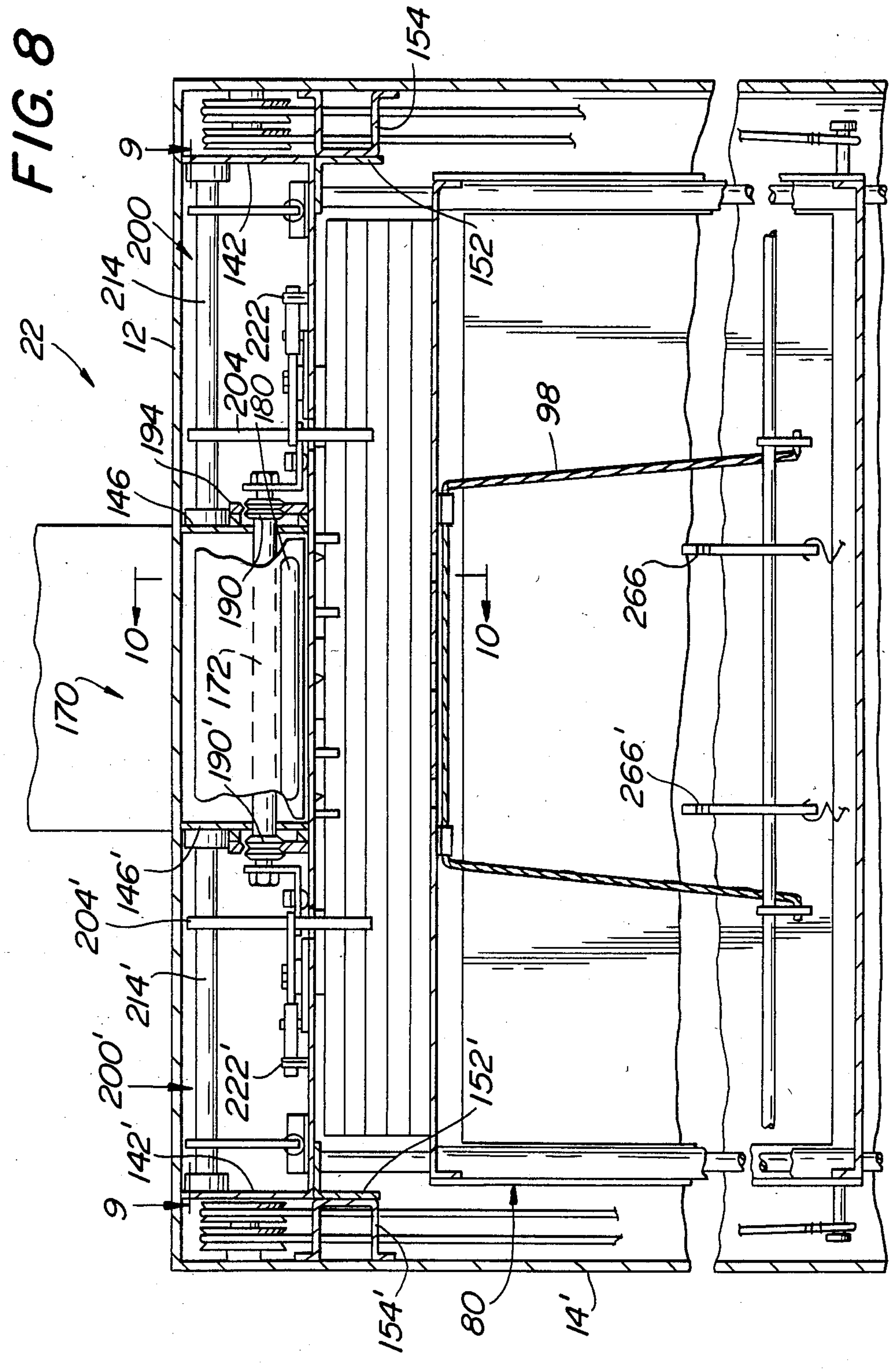
FIG. 8 is a partial section taken along 8—8 in FIG. 2.
Figure 9:
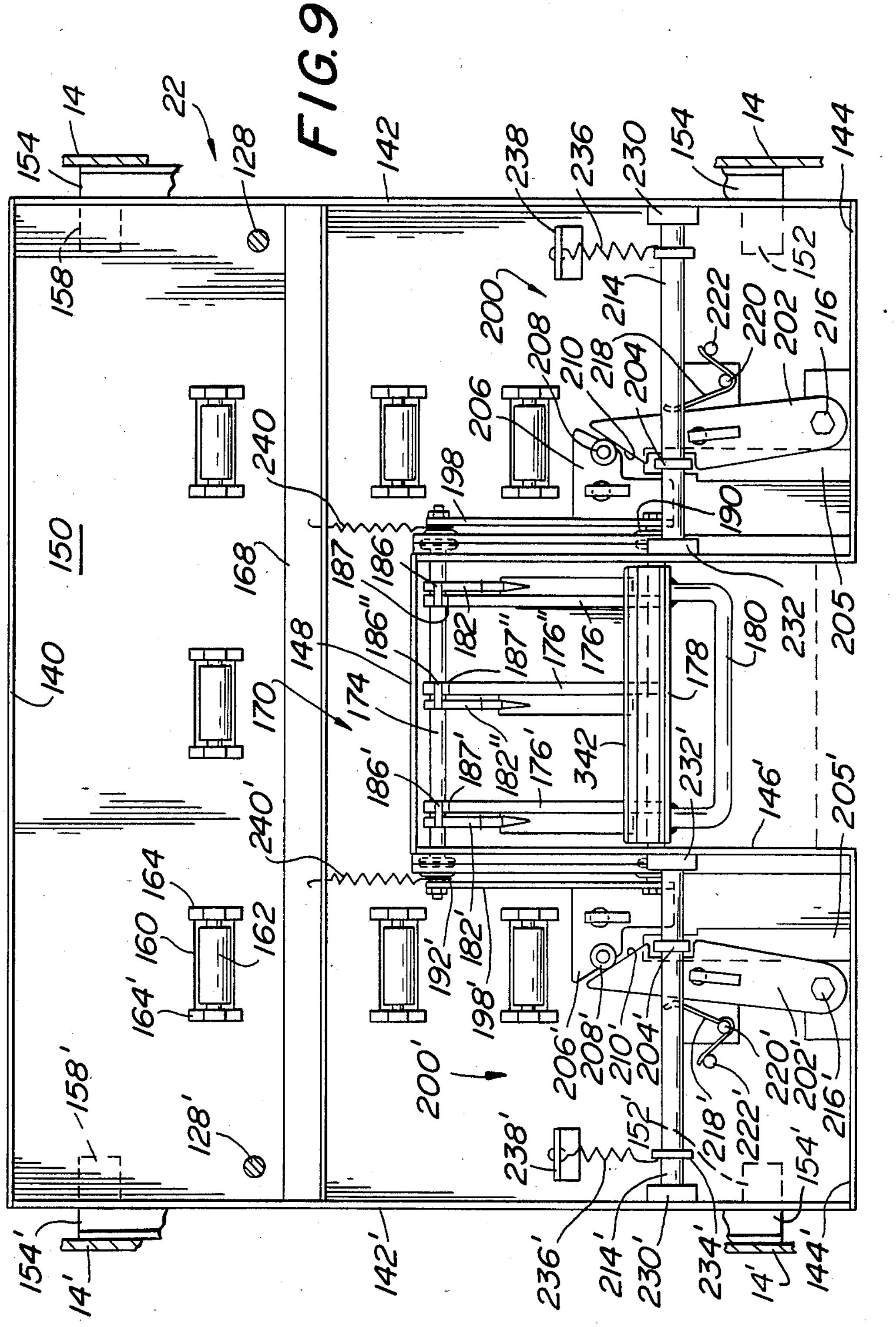
FIG. 9 is a partial top plan taken along 9—9 in FIG. 8.

Newspapers are dispensed one at a time by the gate unit 22. The structure of the gate unit is best shown in FIGS. 8 and 9. The gate unit 22 is provided with a rear wall 140, outer side walls 142, 142', front walls 144, 144', inner side walls 146, 146', and an inner connecting wall 148. See FIG. 9. All walls are connected to each other and to a bottom wall 150. Angle brackets 152, 152' are secured to the underside of the bottom wall 150 near the side walls 142, 142' (FIGS. 8 and 9). The gate unit 22 is inserted in the cabinet for the conventional "honor" system vending machine by securing the elongated hat-shaped mounting brackets 154, 154' to the interior of the cabinet side walls 14, 14' and by bolting or otherwise fastening the brackets 152, 152' to the brackets 154, 154'. Like angle brackets 158, 158' are secured to the underside of the gate unit bottom wall 150 and are bolted to the brackets 154, 154' towards the rear of the cabinet.

Figure 10:
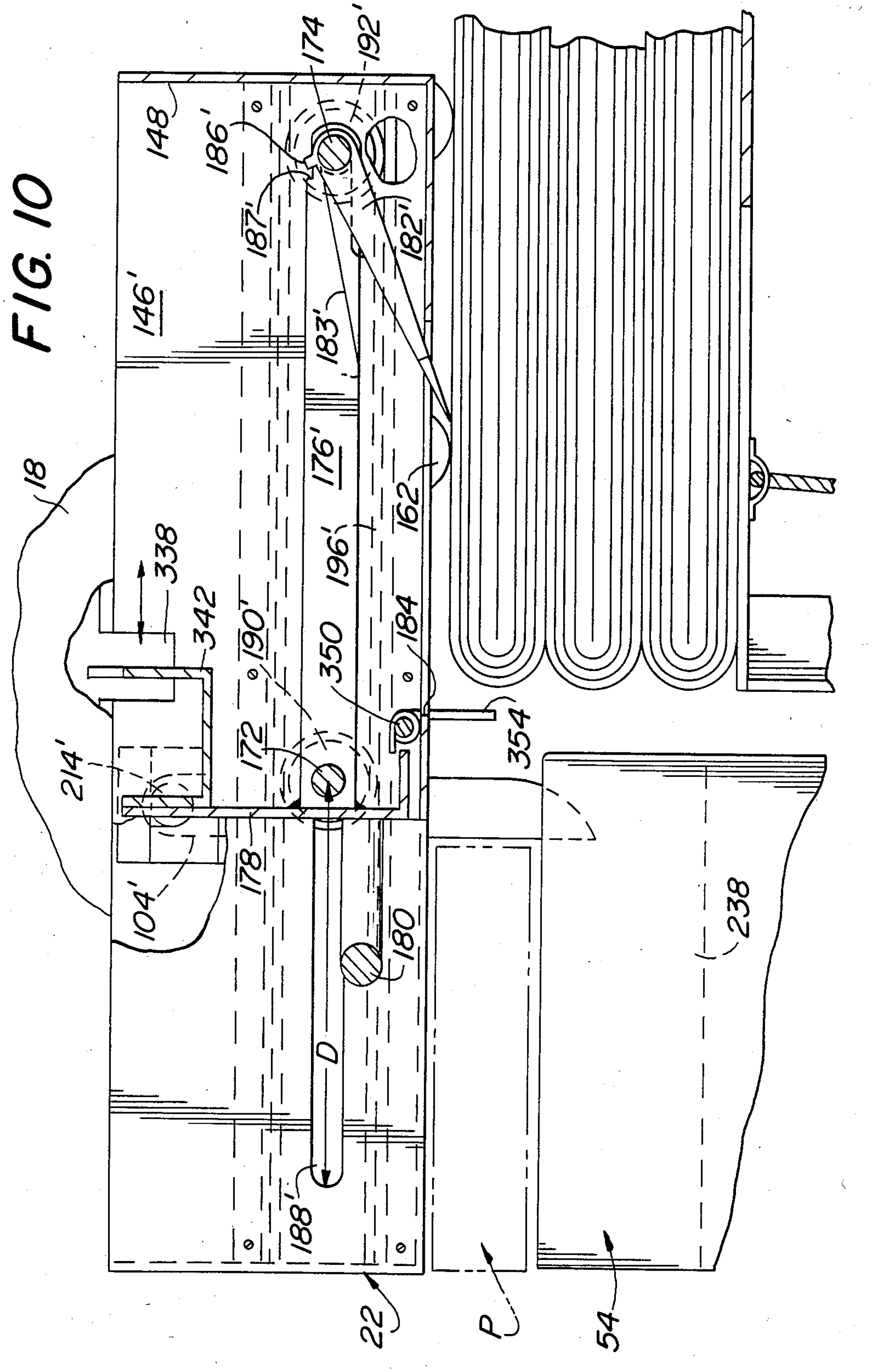
FIGS. 10-12 are enlarged partial side sections taken along 10—10 in FIG. 8 showing operation of the gate unit dispensing and blocking mechanisms and the mechanism for unlatching the front door.

The bottom wall 150 is provided with a series of identical transverse slots 160 (only one of which is numbered). Each slot 160 accomodates a hold-down roller 162 journaled at its end in bearings 164, 164' which are secured to the top side of the bottom wall 150. Each hold-down roller 162 is mounted so as to protrude below the underside of bottom wall 150 and contact the top paper on the elevator 80 (FIG. 10). The rear three hold-down rollers 162 are separated from the front five hold-down rollers 162 by a L-shaped bracket 168 secured to the top side of bottom wall 150. The gate unit includes a dispensing mechanism 170 which is spring-coupled to the bracket 168 by springs 240, 240'.

The dispensing mechanism 170 includes front and rear shafts 172, 174. The shafts 172, 174 are coupled by links 176, 176' and 176" (FIG. 9). The front ends of links 176, 176', 176" are welded or otherwise secured to a L-shaped frame 178. A handle 180 is welded or otherwise secured to the front upstanding leg of frame 178. Three fingers 182, 182', 182" having sharpened ends are mounted on rear shaft 174. Each finger is connected to a link by an associated torsion spring (for example spring 183 in FIG. 10) wound on shaft 174. The springs urge the fingers downwardly so as to protrude through slots 184, 184', 184" in the gate unit bottom wall 150. Fingers 182, 182', 182" are provided with strikers 186, 186', 186" which strike stepped surfaces 187, 187', 187" formed in the rear of links 176, 176', 176" so as to limit the downward movement of the fingers due to the associated torsion springs.

The shafts 172, 174 ride in an elongated slot 188' formed in the inner side wall 146' (FIG. 10) and a parallel, like elongated slot (not shown) formed in the inner side wall 146. When shaft 174 is in the rearmost position (FIG. 10), the spacing between the forward end of slot 188' (and the forward end of the like slot in side wall 146) and forward shaft 172 defines the distance D over which the top paper can be dispensed by dispensing mechanism 170.

A pair of double roller wheels 190, 190' are freely mounted on opposing ends of front shaft 172. A like pair of double roller wheels 192, 192' are freely mounted on opposing ends of rear shaft 174. Double roller wheels 190, 192 ride between an upper track 194 and a lower track 196, the upper and lower tracks being secured to the interior of the inner side wall 146 (FIGS. 8 and 10). Similarly, the double roller wheels 190', 192' ride between an upper track 194' and a lower track 196' which are secured to the interior of the inner side wall 146'. The ends of shafts 172, 174 are connected by a link 198 on one side of the dispensing mechanism 170 and by a link 198' on the other side. The links 198, 198' are secured to shafts 172, 174, for example by a nut threaded on each end of each shaft.

Figures 13, 14:
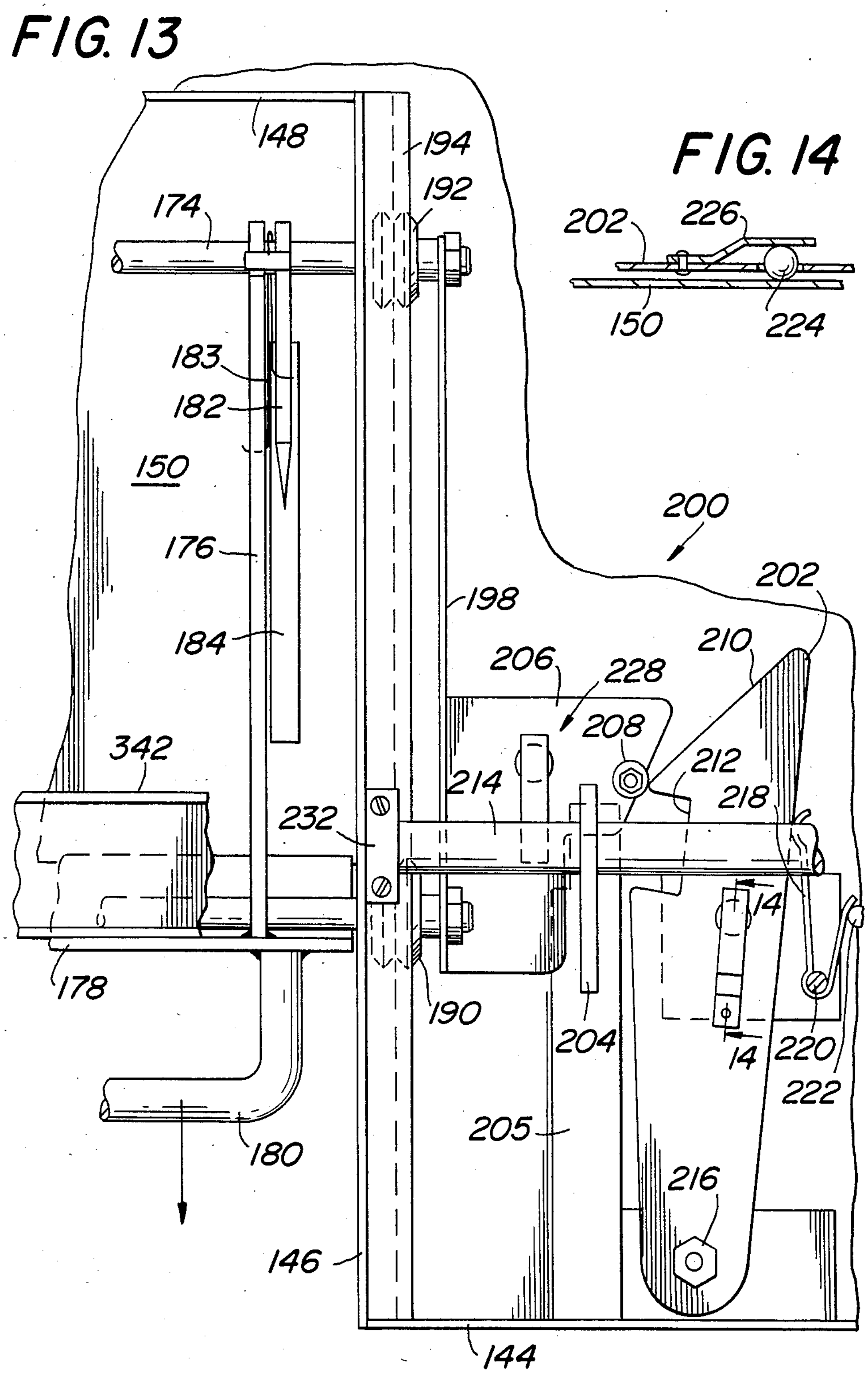
FIG. 13 is an enlarged partial plan of the gate unit dispensing and blocking mechanisms.
FIG. 14 is an enlarged section taken along 14—14 in FIG. 13.

The links 198, 198' form part of a blocking mechanism which is part of the gate unit. The blocking mechanism comprises like portions designated generally as 200, 200' (FIG. 9) on each side of the dispensing mechanism 170. The blocking mechanism portions 200, 200' prevent withdrawal of a newspaper from the elevator stack when the dspensing mechanism 170 is in the rearmost position (FIG. 10). For purposes of explanation, it will suffice to describe the structure and operation of portion 200, it being understood that the structure and operation of portion 200' is the same. Portion 200 of the blocking mechanism comprises the link 198, a latch 202 and a blocking lever 204 which extends through a clearance slot 205 in the gate unit bottom wall 150 (FIG. 9). An enlarged view of the portion 200 of the blocking mechanism is shown in FIG. 13. The link 198 is provided with an enlarged ear 206. An upstanding roller 208 is mounted on the ear 206. The roller engages a cam surface 210 on latch 202. The latch 202 is provided with a notch 212 sized to capture the blocking lever 204 as described hereinafter.

The blocking lever 204 is secured to a shaft 214 for rotation therewith. The latch 202 is pivotably mounted on the gate unit bottom wall 150 by means of a pivot pin 216. The latch is urged towards the blocking lever 204 by a return spring 218 partially wound around a pin 220 secured to bottom wall 150. One end of the spring contacts a bias pin 222 also secured to the bottom wall 150. To facilitate pivotable movement of the latch 202, the latch is provided with a ball bearing 224 seated in an opening in the latch (FIGS. 13 and 14). The ball bearing is held in the latch opening by a retention leaf spring 226 which is riveted to the latch. As shown in FIG. 14, the ball bearing 224 rollably contacts the top surface of the bottom wall 150. Similarly, to facilitate linear reciprocable motion of the link 198 as described hereinafter, a ball bearing and a retent leaf spring designated generally as 228 (FIG. 13) is provided on the enlarged ear 206 of the link 198. The ball bearing is located in an opening in the ear 206 and rollably contacts the gate unit bottom wall 150.

The shaft 214 is journaled at one end in a bearing 230 secured to the interior of the gate unit side wall 142 (FIG. 9). At its other end, the shaft 214 is journaled in a bearing 232 secured to upper track 194 flush against the inside of the gate unit inner wall 146. Thus, the shaft 214 is mounted for rotation only. A return lever 234 (FIG. 9) is secured to the shaft and is coupled to a return spring 236 anchored in a bracket 238 which is fastened to the gate unit bottom wall 150.

Figure 11:
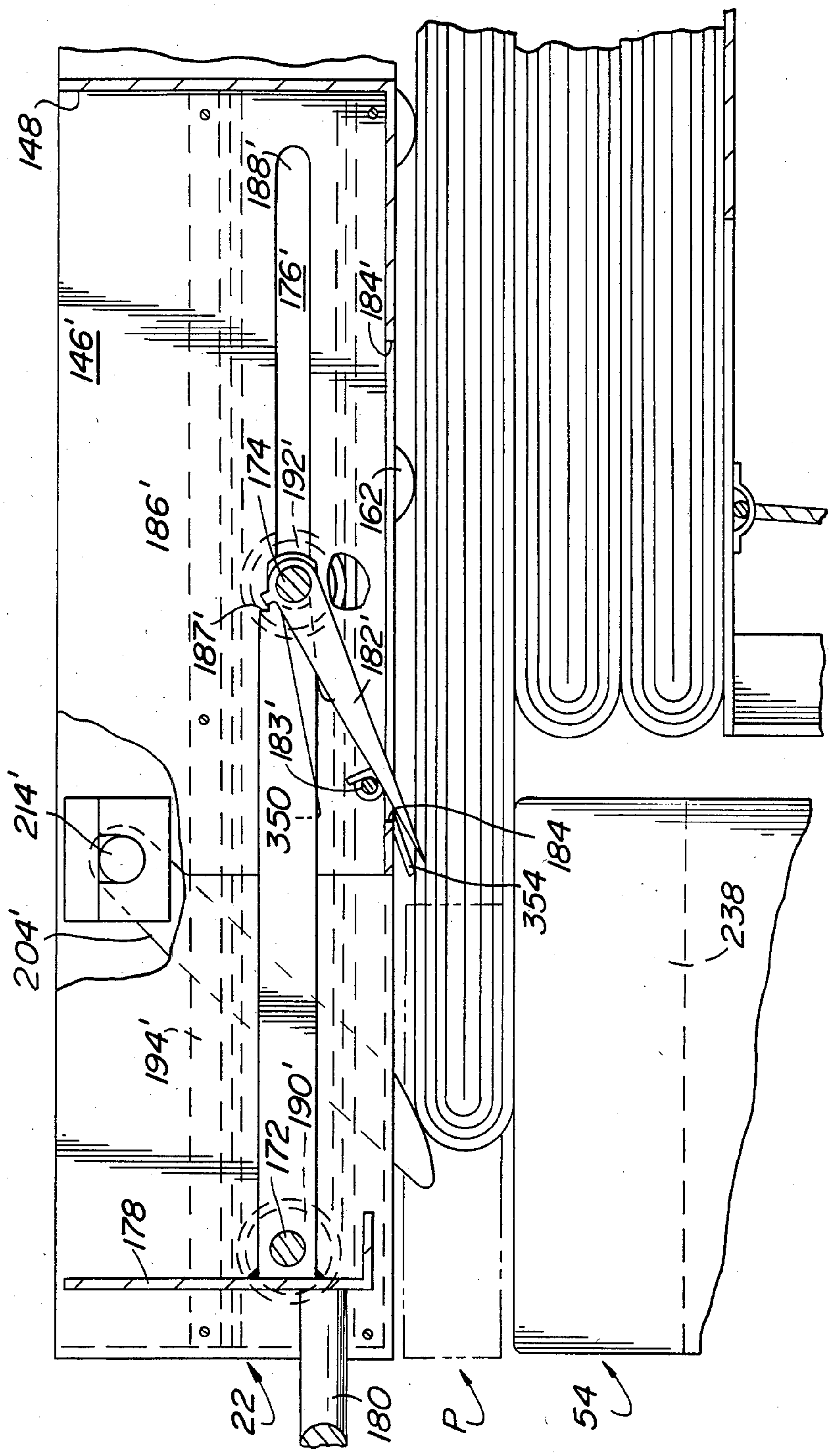

Operation of the dispensing mechanism 170 and the portions 200, 200' of the blocking mechanism is best shown in FIGS. 9–13. Initially, when the dispensing mechanism 170 is in its rearmost position, latch 202 (202') engages the blocking lever 204 (204') so that the blocking lever is captured in the latch notch 212 (212'). In this position, the blocking lever 204 (204') blocks the top paper on the elevator stack from being withdrawn. When the customer pulls handle 180 forward (as indicated by the arrow in FIG. 13), the dispensing mechanism 170 moves forward, the double roller wheels 190, 190' and 192, 192' travelling forward on the associated upper and lower tracks. As the dispensing mechanism 170 moves forward, the fingers 182, 182' grab the surface of the top paper on the elevator stack and push the paper towards the blocking levers 204, 204' (FIG. 11). As the forward edge of the top paper approaches the blocking levers 204, 204', the upstanding ear rollers 208, 208' rollably contact the latch cam surfaces 210, 210' so as to pivot the latches 202, 202' away from the blocking levers 204, 204', thereby freeing the blocking levers. The enlarged link ears 206, 206' then strike the back sides of the blocking levers, rotating the blocking levers upwardly in slots 205, 205' so as to clear a path for the paper. It should be noted that the blocking levers 204, 204' are not displaced initially by the newspaper, but once displaced they are held in the cleared position by the newspaper (FIG. 11).

When the shaft 172 reaches the forward edge of the inner side wall elongated slot 188', the dispensing unit 170 is in its forwardmost position and can advance no further. See FIG. 11. This corresponds to the forwardmost position of the dispensed top paper. In this position, part of the top paper rests on the movable paper support unit 54, part of the paper rests on the next paper in the elevator stack, and an intermediate portion of the paper bridges the gap between the rear of the movable paper support unit 54 and the elevator stack. The paper has now been partially dispensed by the dispensing unit 170 into the paper access zone indicated by broken lines P (FIGS. 4 and 10). At this point, the customer can release handle 180. The paper can then be grasped by the customer and withdrawn from the cabinet. To facilitate withdrawal of the newspaper by the customer, the movable paper support unit 54 is provided with a recess 238 (FIGS. 4 and 10). Thus, once the top paper has entered the paper access zone, the customer can insert his hand in the recess 238 and grasp and withdraw the paper.

Before the paper is withdrawn by the customer, he releases the handle 180. The dispensing unit 170 is then returned to the rearmost position (FIG. 10) by the return springs 240, 240' (FIG. 9) which couple rear shaft 174 to the L-shaped bracket 168. As the dispensing unit travels backward, the enlarged link ears 206, 206' travel backward and release the blocking levers 204, 204'. The blocking levers remain in the cleared position, resting on the paper (FIG. 11). As the enlarged link ears travel backward, the return springs 218, 218' pivot latches 202, 202' back towards their initial positions (FIG. 9) in rollable contact with the ear rollers 208, 208'. The elevation of shafts 214, 214' is such that the latches 202, 202' do not contact the blocking levers 204, 204' when the latches return to their initial positions. When the paper is withdrawn by the customer, the back edge of the paper clears the blocking levers. The return springs 236, 236' pull the return leavers 234, 234' backwards so as to rotate shafts 214, 214' and return the blocking levers 204, 204' to the vertical position (FIG. 10). As the blocking levers 204, 204' are returned to the vertical position, they slidingly contact the side edges of latches 202, 202', pivoting the latches slightly away from their initial positions. When the blocking levers reach the vertical position, they align with the notches 212, 212'. The latches 202, 202' pivot back towards their initial positions, capturing the blocking levers. When captured, the blocking levers cannot be moved except by the dispensing mechanism (as previously described).

Whenever a paper, after being partially dispensed by the dispensing unit 170, is withdrawn by the customer, the weight on the elevator 80 is reduced. Accordingly, the springs 120, 120' pull the pulley cables so as to advance the elevator 80 upwardly such that the next paper in the stack contacts the gate unit hold-down rollers. The blocking levers prevent withdrawal of the next newspaper from the elevator stack until the dispensing unit 170 is advanced again by pulling handle 180. Preferably, the newspaper stack on elevator 80 is set back from the blocking levers 204, 204' to preclude unauthorized access to the newspaper stack, even though the blocking levers would prevent withdrawal of a paper. The dispensing unit 170 cannot be advanced again, by pulling handle 180, until the dispensing unit is released by a dispensing mechanism latch which is operated by the coin mechanism.

The dispensing mechanism latch is designated generally as 286 in FIGS. 18–21. The dispensing mechanism latch is mounted in the coin mechanism box 18. A conventional coin mechanism 288 is secured by suitable means such as struts or the like (not shown) to the interior walls of the coin mechanism box 18. The latch 286 includes a carriage 290 mounted within the coin mechanism box 18 so as to be reciprocable between rear and forward positions which correspond to the rear and forward positions of the dispensing mechanism 170. The carriage 290 comprises a U-shaped member 292 having side extending flanges 294, 294'. On each flange there is mounted a U-shaped track 296, 296'. A spring 298 is coupled at one end to the bottom wall of U-shaped member 292 and at the other end to a bracket 300 secured to the bottom wall of the coin mechanism box 18. Rollers 302, 302' are mounted on the side walls of the U-shaped member 292. The rollers 302, 302' ride in U-shaped tracks 304, 304' secured to the side walls of the coin mechanism box 18. L-shaped members 306, 306' are secured by welding or the like to the top flanges of U-shaped tracks 304, 304'. Rollers 308, 308' are mounted on the L-shaped members 306, 306'. The top flanges of U-shaped tracks 296, 296' ride over the rollers 308, 308' when the carriage 290 is reciprocated between the rear and forward positions.

A vertical plate 310 is secured by welding or the like to U-shaped track 296. A post 312 is secured to plate 310 for purposes described hereinafter. A pivotable lever 314 provided with a flanged arm 316 is mounted by a pivot pin 318 to the L-shaped member 306'. The plate 310 is provided with a stepped edge 320 and a gradual sloping edge 322 for cooperation with the lever arm 316 as described hereinafter.

Figure 20:
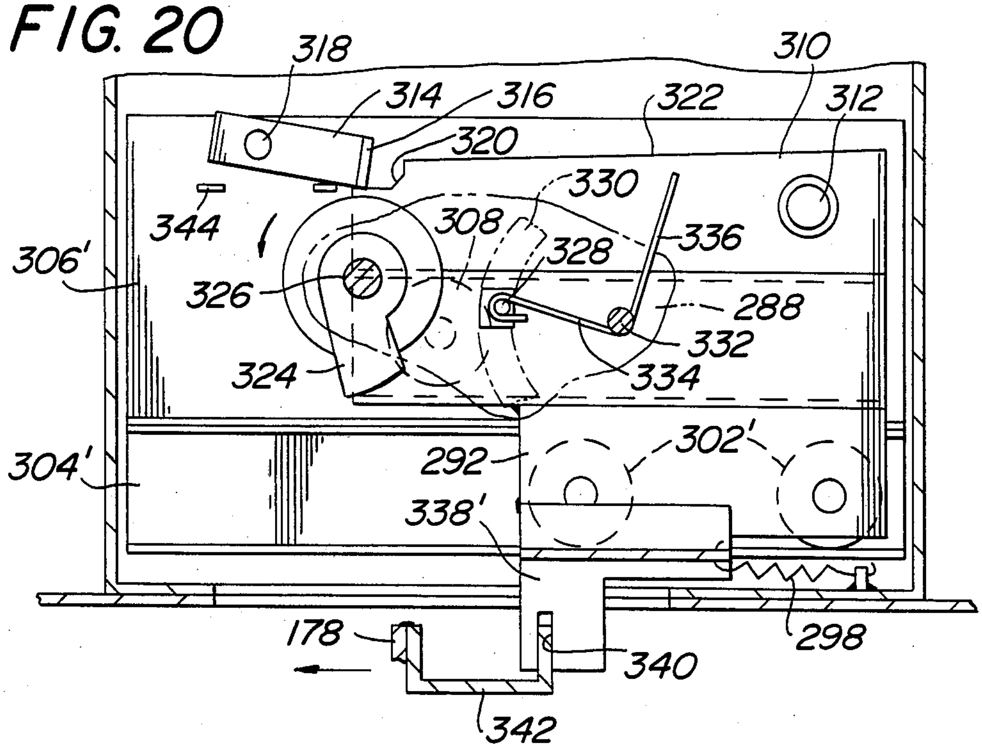
FIGS. 20 and 21 are side sections taken along 20—20 in FIG. 18 showing the operation of the coin mechanism and dispensing mechanism latch.
Figure 21:
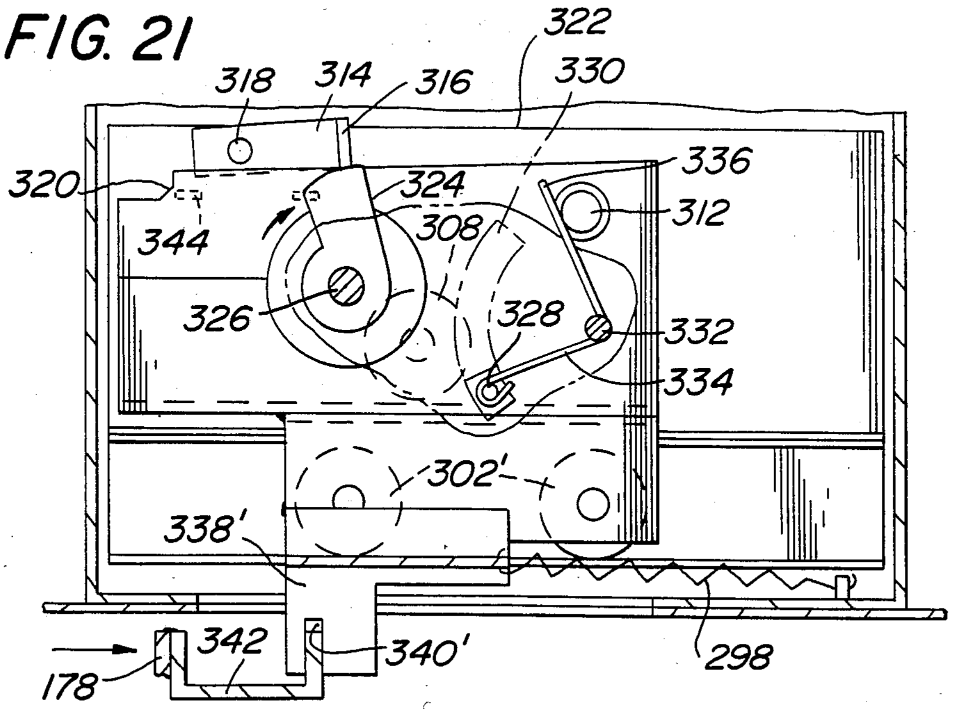

The coin mechanism 288 is a commercially available mechanism comprising a cam 324 secured to a rotatable shaft 326 and a pin 328 which protrudes through an arcuate slot 330 in the coin mechanism wall (shown in broken lines in FIGS. 20 and 21). A post 332 is secured to the coin mechanism wall, and a spring 334 is coupled to the pin 328 and wrapped around the post 332. The spring 334 has a free leg 336.

The carriage 290 is coupled to the dispensing unit 170 by means of slotted plates 338, 338'. Plate 338 is provided with a captive slot 340. Plate 338' is provided with a captive slot 340'. The rear leg of a U-shaped member 342 is permanently captured in slots 340, 340'. The U-shaped member 342 is secured by welding or the like to the L-shaped frame 178 in the dispensing mechanism 170 (FIG. 9).

The lever 314 determines whether the carriage 290 is locked in position or whether the carriage can be reciprocated between the rear and forward positions. Since the U-shaped member 342 is captured in slots 340, 340' of the carriage plates 338, 338', the dispensing mechanism 170 is either locked in position or free to reciprocate between its rear and forward positions depending on the position of the latch 314. Operation of the carriage 290 and the dispensing mechanism 170 is described more fully hereinafter.

Referring to FIG. 20, before any coins are inserted in the coin mechanism 288, the carriage 290 is in the rear position with spring 288 contracted. When the proper amount of coins is inserted in the coin mechanism box, the coin mechanism 288 is in a condition referred to hereinafter as the "set" condition wherein the cam 324 is rotated upwardly in increments (in the direction of the arrow shown in FIG. 20) as is well-known in the art. The cam 324 contacts the underside of the lever 314, pivoting the lever and raising the arm 316 above the step 320. To prevent the lever 314 from flipping backwards due to inertia, a limit stop 344 is secured to the L-shaped member 306' toward the back edge of the lever. The user then pulls the dispensing mechanism 170 forward (FIGS. 10 and 11), and the dispensing mechanism drags the carriage 290 forward inside the coin mechanism box 18. The carriage rollers 302, 302' ride on the tracks 304, 304', and the carriage tracks 296, 296' ride on the stationary rollers 308, 308'. The lever arm 316 is held aloft by cam 324, above the sloping edge 322 of carriage plate 310. When the dispensing mechanism 170 reaches its forwardmost position, carriage 290 reaches its forwardmost position.

As the carriage 290 reaches its forwardmost position, the post 312 strikes the free leg 336 of spring 334, causing the spring to pivot about post 322, thereby dragging the pin 328 downwardly in slot 330. The pin 328 is coupled by gearing (not shown) within the coin mechanism to the cam shaft 326. As the pin 328 is dragged downwardly, the shaft 326 is rotated so as to remove cam 324 from contact with lever 314. The cam 324 rotates downwardly, as indicated by the arrow in FIG. 21, and returns to the position shown in FIG. 20. For this position of the cam, the coin mechanism is in the condition referred to hereinafter as the "reset" condition. When the user releases the dispensing mechanism 170, the dispensing mechanism is spring-urged back to its rear position as previously explained. Since the dispensing mechanism is coupled to the carriage 290 by means of member 342 and plates 338, 338', the dispensing mechanism drags the carriage 290 back to its rear position. Return motion of the carriage to its rear position is assisted by the spring 298. During return of the carriage 290 to its rear position, the link arm 316 rides on the sloping edge 322 of plate 310, and the arm drops over the step 320. The arm returns to the position shown in FIG. 20 wherein forward motion of the carriage would result in step 320 striking arm 316. Accordingly, carriage 290 is locked in position as shown in FIG. 20 until the proper amount of coins is again inserted in the coin mechanism 288 so as to displace cam 324 and remove lever 314 from obstructing the carriage motion.

From the foregoing, it can be appreciated that the dispensing mechanism 170 is held inoperative until the proper amount of coins is inserted in the coin mechanism 288 so that the coin mechanism transfers from the "reset" to the "set" condition. Once the proper amount of coins is inserted, the dispensing mechanism 170 is freed to dispense a newspaper as previously described.

The mechanism for adjusting the height of the paper access zone is best shown in FIGS. 2, 5 and 15–16. Referring to FIG. 5, the movable paper support unit 54 is displaced upwardly or downwardly by means of the racks 66, 66' and pinions 68, 68'. The pinions 68, 68' are mounted on shaft 70 for rotation therewith. The shaft 70 is journaled in bearings 241, 241' secured to the display unit side walls 44, 44' (FIG. 5). A disc 242 is freely mounted on one end of shaft 70 (FIG. 5) and is secured by welding or the like to the hub portion 244 of an adjustment knob 246 (FIG. 15). The shaft 70 is provided with a pin 248 which is slidably engaged in a slot 250 in the knob hub portion 244. The slot 250 extends parallel to the longitudinal axis of the knob and runs from the inner diameter of hub portion 244 to its outer diameter. The knob 246 is also provided with a recess 252 which surrounds the end of shaft 70. A washer 253 is mounted at the end of the shaft. A return spring 255 surrounds the shaft end and contacts the washer 253 and the floor 257 of recess 252 so as to spring bias the knob and disc towards the display unit side wall 44'. A locating pin 254 is secured to the display unit side wall 44' and seats in one of a series of openings 56 in disc 242.

The elevation of the movable paper support unit 54 is adjusted by pulling the knob 246 as indicated by the arrow in FIG. 15 so that hub portion 244 slides over pin 248 and by then rotating the knob. Rotation of the knob results in likewise rotation of shaft 70, hence pinions 68, 68'. The pinions displace the racks 66, 66' upwardly or downwardly (depending on the direction of rotation of the shaft) thereby changing the elevation of the movable paper support unit 54. Accordingly, the height of the paper access zone is decreased or increased. When the desired elevation is reached, i.e. when the desired height for the paper access zone is attained, the knob 246 is released, and the knob and disc 242 are spring-urged back towards the side wall 44'. The locating pin 254 seats in one of the disc openings 256 to lock the disc 242, knob 246 and shaft 70 against furhter rotation.

To assist the delivery man in adjusting the height of the paper access zone, the disc 242 is calibrated. Each openings 256 in the disc is associated with indicia adjacent thereto. The indicia is applied to the disk by painting, etching or other suitable means. The indicia represents the number of pages of a single newspaper which corresponds to a particular paper thickness. In addition, to facilitate finer adjustments for thinner papers, hence smaller access zone heights, the openings 256 are spaced more closely together as the access zone height decreases. See FIG. 16.

The elevation of the movable paper support unit 54 over the full range of paper access zone heights is such that the blocking levers 204, 204' always extend into a pair of clearance slots 258, 258' in the top of the paper support unit 54 (FIGS. 4 and 10). The slots are sized so as to provide a clearance for the blocking levers 204, 204' as they move forwardly and upwardly during advance of the dispensing unit 170.

A mechanism for locking the front door 20 so as to preclude access to the display paper housed in paper display unit 78 (until the stack of newspapers on the elevator 80 has been exhausted) is best shown in FIGS. 7A, 7B and 17. The mechanism comprises wire 98 which extends over brackets 94, 94' (secured to the underside of the elevator top wall 82). See FIGS. 7B and 17. The wire 98 is anchored at its ends on a pair of links 260, 260' which are secured to a shaft 264 for rotation therewith. The shaft 264 is suitably journaled at both ends in bearings (not numbered) secured to the front elevator struts 86, 92 (FIG. 7B). Bell cranks 266, 266' are secured to shaft 264 for rotation therewith. The bell cranks are provided with notches 270, 270' and are coupled to the elevator 80 by springs 279, 279' (FIG. 7B). Accordingly, the bell cranks are spring-urged to the upright position, and shaft 264 is therefore urged so as to rotate links 260, 260' such that the links pull the wire 98 taut.

A bail 274 is disposed forwardly of shaft 264. Bail 274 comprises a horizontal rod 275 and a pair of suspension rods 277, 277'. Suspension rods 277, 277' are pivotably coupled to pivotable levers 276, 276' and are slidably coupled to rod 275. (FIGS. 7A and 17). Levers 276, 276' are mounted on pivot pins 278, 278' which are secured to support brackets 64, 64'. The brackets are fastened to the display unit rear flanges 65, 65' by welding or the like or may be formed integrally with the flanges. A pair of leaf springs 400, 400' are riveted or otherwise secured to the display unit rear flanges 65, 65'. The leaf springs are disposed so as to yieldingly contact the nose portions of door latches 30, 30' when door 20 is closed.

Normally, wire 98 is in the position shown in solid lines in FIGS. 7B and 17, and bell cranks 266, 266' are in the upright position shown in solid lines. The levers 276, 276' extend through associated slots in the display unit side walls 44, 44' (FIG. 7A) and are coupled to the display unit sidewalls by springs 281, 281'. The levers are spring urged such that the lever 276 seats in a notch 280 in door latch 30 and lever 276' seats in a notch 280' in door latch 30' (FIG. 5). Accordingly, the door 20 is locked in position and cannot be swung open.

Figure 12:
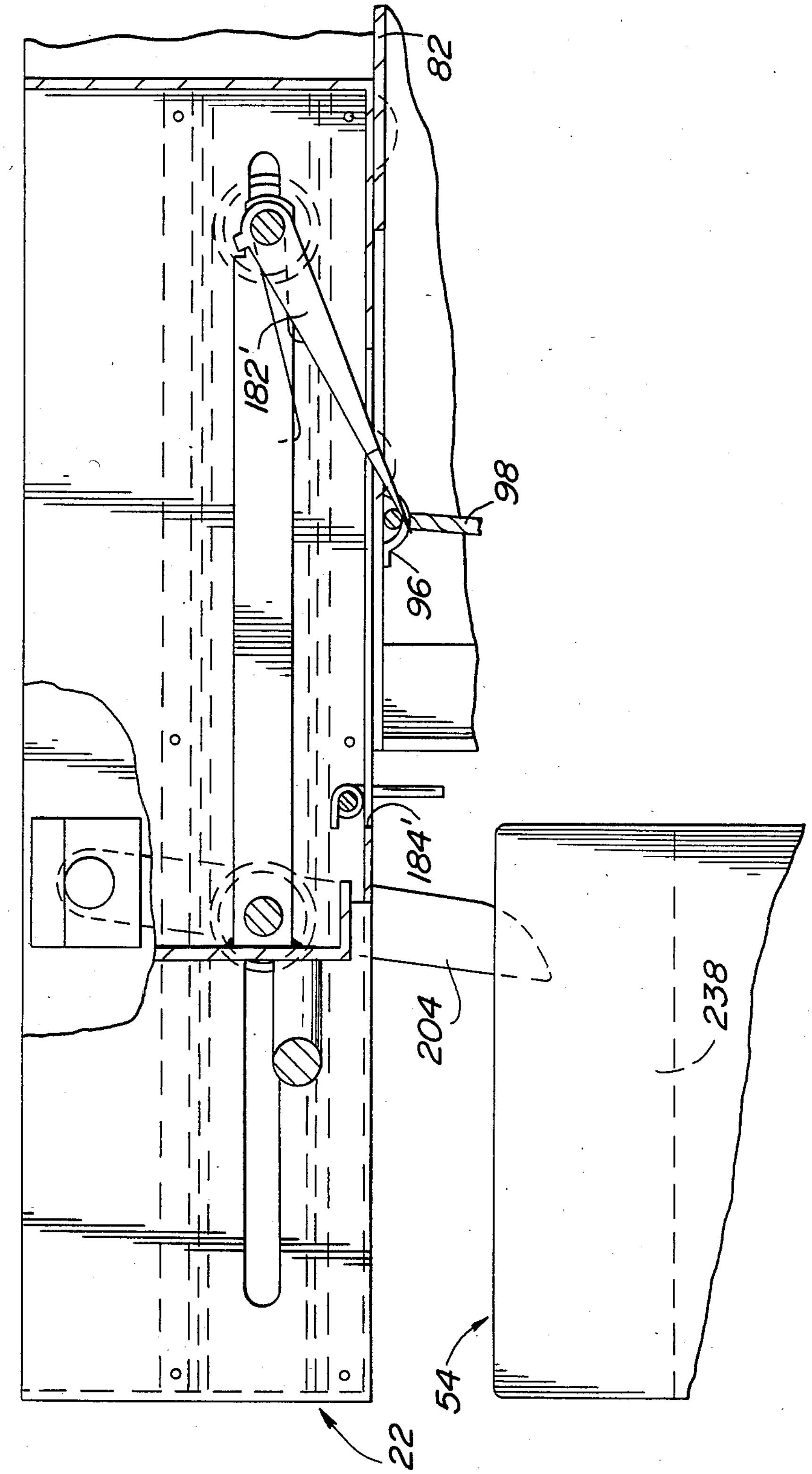

When the paper stack on the elevator 80 has been exhausted, operation of the dispensing mechanism 170 (by pulling handle 180 forwardly) results in the fingers 182, 182', 182'' entering associated slots 284, 284', 284'' in the elevator top wall 82 (FIGS. 7B and 12). The slots 284, 284', 284'' are located inwardly of the brackets 94, 94' so that the fingers 182, 182', 182'' catch the top horizontal portion of the wire 98 and, as the fingers continue to move forwardly, pull the wire forwardly as shown in phantom in FIG. 17. As the wire 98 is pulled forward, it pulls the free ends of links 260, 260' up, thereby rotating shaft 64 so as to cause bell cranks 266, 266' to rotate forwardly whereby the bell cranks capture the bail rod 275 in notches 270, 270' and push the rod 275 downwardly. As a result, the levers 276, 276' are pivoted so as to release the door latches 30, 30'. The leaf springs 400, 400' urge the door latches 30, 30' forward so as to open slightly the door 20.

When the customer releases the handle 180, the dispensing mechanism returns to its rearmost position (FIG. 10) due to return springs 240, 240' (FIG. 9). During the return travel of the dispensing mechanism, the fingers 182, 182', 182'' release the wire 98. The wire 98 therefore returns to its normal taut position, the links 260, 260' drop, shaft 264 rotates backward, bellcranks 266, 266' release rod 275, and the pivotable levers 276, 276' pivot back towards the horizontal. The levers drop on the nose portions of latches 30, 30', without entering the latch notches, the door 20 having been open slightly during the forward motion of the dispensing mechanism 170.

The customer then swings the front door 20 fully open so as to gain access to the (last) paper stored in the display unit 38. After removing the (last) paper, the customer releases the door 20. When the door 20 is released, the spring hinges 24, 24' swing the door back towards the cabinet, and the door latches 30, 30' positively contact the undersides of the pivotable levers 276, 276'. The levers ride on the downwardly sloping top edges of the nose portions of door latches 30, 30'. The nose portions of latches 30, 30' contact and urge the associated leaf springs 400, 400' rearwardly, and the levers 276, 276' drop into the latch notches 280, 280' so as to again lock the front door in the closed position. With the papers removed from the display unit, the "Sold Out" sign on the movable paper support unit rear wall is visible so as to inform prospective customers that no further papers are available.

Figure 22:
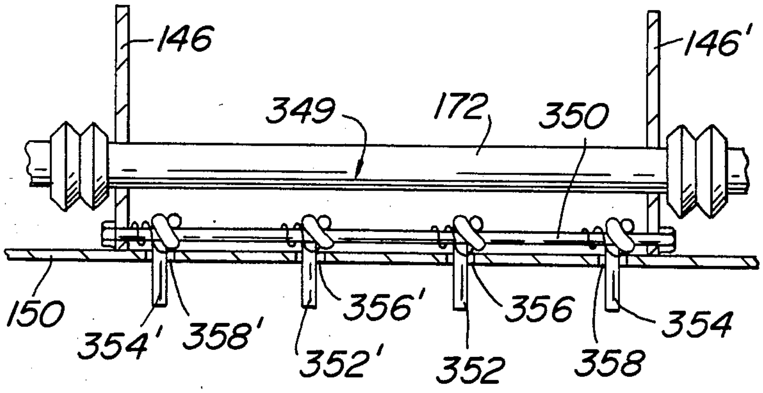
FIG. 22 is an enlarged partial front section of the gate unit showing a further portion of the blocking mechanism.

As previously described, the blocking levers 204, 204' are operated by the dispensing mechanism 170 during its forward stroke to clear a path for the top paper being dispensed. When the dispensing mechanism 170 reaches the end of the forward stroke, the mechanism could be held by the user in the forward position so that the blocking levers remain clear of the paper path. For this position of the dispensing mechanism, the user could attempt to obtain access to a second (next) paper on the elevator stack. To prevent such unauthorized access, the gate unit is provided with a further blocking mechanism portion 349. The blocking mechanism portion 349 comprises a shaft 350 secured at both ends to the gate unit inner side walls 146, 146'. See FIG. 22. Four spring fingers 352, 354 and 352', 354' are coupled to shaft 350. The fingers are spring urged downwardly to vertical positions. The fingers extend downwardly through associated slots 356, 358 and 356', 358' in the gate unit bottom wall.

Referring to FIGS. 10-12, the shaft 350 is disposed just above the gate unit bottom wall 150, to the rear of the dispensing mechanism front shaft 172 (when the dispensing mechanism is in the rear position) such that the fingers extend downwardly in a vertical plane between the movable paper support unit 54 and the paper stack. When the dispensing mechanism is advanced to its forward position (FIG. 11), the forward edge of the paper strikes the fingers 352, 354 and 352', 354', yeildingly displacing the fingers forward and upwardly. As the paper is withdrawn by the user, the paper clears the fingers and the fingers snap back to the vertical position. It should be noted that the fingers 352, 354 and 352', 354' are mounted on shaft 350 so that they cannot be displaced rearwardly and that they are not operated by the dispensing mechanism but, instead, are operated by the paper itself. If the dispensing mechanism is retained in the forward position, with blocking levers 204, 204' held clear of the paper path, the fingers 352, 354 and 352', 354' block access to the elevator stack. Thus, the fingers prevent unauthorized access to a second newspaper when the dispensing mechanism is retained in the forward position.

As should be evident from the foregoing, an advantage of the invention is that the conventional "honor" system cabinet need only be retrofitted with mounting brackets 154, 154' (FIG. 8) and mounting brackets 34, 34' and 36, 36' (FIG. 2) to enable the cabinet to house the gate unit 22, the paper display unit 38 and the movable paper support unit 54. The paper display unit 38 may be conveniently mounted in the brackets 34, 34' and 36, 36', and the gate unit 22 may be bolted straight-forwardly to the mounting brackets 154, 154' to convert the "honor system" machine to a single newspaper vending machine. The only further modification required is the addition of the mechanism for automatically latching the front door upon operation of the dispensing mechanism 170 (when the paper stack on the elevator has been exhausted) and the coin mechanism operated latch for the dispensing mechanism.

It should be appreciated that the conversion of a "honor" system machine to a single paper vending machine according to the present invention may be accomplished rapidly with a minimum number of steps due to the modular nature of the three basic units, namely, the gate unit 22, paper display unit 38 and movable paper support unit 54.

The present invention may be embodied in other specific forms without departing from the spirit or essential attributes thereof and, accordingly, reference should be made to the appended claims, rather than to the foregoing specification, as indicating the scope of the invention.

I claim:

1. Single newspaper vending machine, comprising:

an elevator for supporting a stack of newspapers, means for advancing said elevator to an elevation at which the top newspaper of the stack is in a position to be dispensed, a gate unit including a dispensing mechanism reciprocable between rear and forward positions for contacting and advancing the top paper on the stack horizontally such that a portion of the paper enters a paper access zone during movement of the dispensing mechanism from the rear to the forward position, and a blocking mechanism for preventing horizontal advance of a newspaper from the stack when the dispensing mechanism is in the rear position, said blocking mechanism including a blocking member biased to a position wherein the member blocks horizontal advance of a newspaper, and a latch spaced from said dispensing mechanism for capturing said blocking member in said position, said dispensing mechanism including means for moving said latch as said dispensing mechanism moves from said rear position to said forward position so as to free said blocking member and for yieldingly displacing the freed blocking member so as to clear a path for the newspaper being advanced by the dispensing mechanism to the paper access zone, a coin mechanism, and a dispensing mechanism latch operatively associated with the coin mechanism for locking the dispensing mechanism in the rear position when the coin mechanism is in a reset condition and for releasing the dispensing mechanism when the coin mechanism is in a set condition.

2. Single newspaper vending machine according to claim 1 further including a movable paper support unit disposed below said gate unit, and means for adjusting the elevation of said movable paper support unit so as to adjust the spacing between said gate unit and movable paper support unit, said spacing defining the height of said paper access zone.

3. Single newspaper vending machine according to claim 1 wherein said means for advancing said elevator includes at least a pair of springs, each spring being associated with a side of the elevator, plural cables secured to the elevator, and plural pulleys, each cable being partially wrapped on an associated pulley and secured to one of said springs such that the cables secured to one side of the elevator are secured to one spring and the cables secured to the other side of the elevator are secured to the other spring.

4. Single newspaper vending machine according to claim 1 wherein said means for advancing said elevator includes at least a pair of springs associated with opposite sides of said elevator, and an adjustment mechanism coupled to said elevator and said springs for equalizing the tension on said springs.

5. Single paper vending machine according to claim 1 wherein said gate unit includes a further blocking mechanism adapted and arranged so as to be contacted and displaced yieldingly by said top paper as the top paper is being advanced to said paper access zone from an initial position obstructing access to the paper stack to a clearance position and to return to said initial position and thereby obstruct access to said paper stack when said top paper is withdrawn from contact therewith.

6. Single newspaper vending machine according to claim 1 wherein said dispensing mechanism latch includes a carriage operatively associated with said dispensing mechanism so as to be reciprocable therewith between rear and forward positions, and means operatively associated with said carriage for resetting said coin mechanism.

7. Single newspaper vending machine, comprising:
an elevator for supporting a stack of newspapers,
means for advancing the elevator to an elevation at which the top newspaper of the stack is in a position to be dispensed,
a gate unit including a dispensing mechanism reciprocable between rear and forward positions for contacting and advancing the top newspaper on the stack horizontally such that a portion of the paper enters a paper access zone during movement of the dispensing mechanism from the rear to the forward position, first blocking means operatively associated with the dispensing mechanism for preventing horizontal advance of a newspaper from the stack when the dispensing mechanism is in the rear position, and second blocking means adapted and arranged so as to be contacted and displaced yieldingly from an initial position obstructing access to the paper stack to a clearance position by said top paper as the top paper is being advanced to the paper access zone and to return to said initial position and thereby obstruct access to said paper stack when the top paper is withdrawn from contact therewith.

8. Single newspaper vending machine according to claim 7 including a coin mechanism, and a dispensing mechanism latch operatively associated with the coin mechanism for locking the dispensing mechanism in the rear position when the coin mechanism is in a reset condition and for releasing the dispensing mechanism when the coin mechanism is in a set condition.

9. Single newspaper vending machine according to claim 8 wherein said dispensing mechanism latch includes a carriage reciprocable in tandem with said dispensing mechanism, and means operatively associated with the carriage for resetting the coin mechanism.

10. Single newspaper vending machine according to claim 7 including a movable paper support unit disposed below said gate unit, and means for adjusting the elevation of said movable paper support unit so as to adjust the spacing between said gate unit and movable paper support unit, said spacing defining the height of said paper access zone.

11. Single newspaper vending machine according to claim 7 wherein said means for advancing said elevator includes at least a pair of springs, plural pulleys, plural cables secured to said elevator and wrapped on said pulleys, such that the cables secured to one side of the elevator are secured to one of said springs and the cables secured to the other side of said elevator are secured to the other of said springs.

12. Single newspaper vending machine according to claim 7 wherein said means for advancing said elevator includes at least a pair of springs associated with opposite sides of said elevator, and an adjustment mechanism coupled to said elevator and said springs for equalizing the tension on said springs.

13. Single newspaper vending machine, comprising:
a cabinet and a front door swingably mounted thereon,
an elevator for supporting a stack of newspapers,
means for advancing said elevator to an elevation such that the top newspaper on the stack is in a position to be dispensed,
a gate unit including a dispensing mechanism reciprocable between rear and forward positions for contacting and advancing the top newspaper on the stack horizontally such that a portion of the paper enters a paper access zone during movement of the dispensing mechanism from the rear to the forward position, and a blocking mechanism operatively associated with the dispensing for preventing horizontal advance of a newspaper from the stack when the dispensing mechanism is in the rear position, said blocking mechanism including a blocking member biased to a position wherein the member blocks horizontal advance of a newspaper, and a latch spaced from said dispensing mechanism for capturing said blocking member in said position, said dispensing mechanism including means for moving said latch as said dispensing mechanism moves from said rear position to said forward position so as to free said blocking member and for yieldingly displacing the freed blocking member so as to clear a path for the newspaper being advanced by the dispensing mechanism to the paper access zone,
a paper display unit for housing a display newspaper, said paper display unit being disposed behind said front door, and
means operatively associated with said dispensing mechanism for locking said front door in a closed position so as to prevent access to said display newspaper during movement of said dispensing mechanism from said rear to said forward position in the presence of one or more newspapers on said elevator, said dispensing mechanism including means for causing said door locking means to release said front door during movement of said dispensing mechanism from said rear to said forward position in the absence of any newspapers on said elevator,
whereby said front door may be swung open when released to provide access to said display newspaper in said paper display unit.

14. Single newspaper vending machine according to claim 13 including a movable paper support unit disposed below said gate unit,
said movable paper support unit being mounted in telescoping relation with said paper display unit, and means for adjusting the elevation of said movable paper support unit so as to adjust the spacing between said gate unit and movable paper support unit, said spacing defining the height of said paper access zone.

15. Single newspaper vending machine according to claim 13 wherein said means for advancing said elevator includes at least a pair of springs, plural pulleys, plural cables secured to the elevator, each cable being wrapped on an associated pulley, and each cable being coupled to one of said springs such that the cables secured to one side of the elevator are coupled to one spring and the cables secured to the other side of the elevator are coupled to the other spring.

16. Single newspaper vending machine according to claim 13 wherein said means for advancing said elevator includes at least a pair of springs associated with opposite sides of said elevator, and an adjustment mechanism coupled to said elevator and said springs for equalizing the tension on said springs.

17. Single newspaper vending machine according to claim 13 including a further blocking mechanism adapted and arranged to be contacted and displaced yieldingly by said top paper as the top paper is being advanced to said paper access zone from an initial position obstructing access to the paper stack to a clearance position and to return to said initial position and thereby obstruct access to said paper stack when said top paper is withdrawn from contact therewith.

18. Single newspaper vending machine according to claim 13 including a coin mechanism, and a dispensing mechanism latch operatively associated with said coin mechanism for locking the dispensing mechanism in the rear position when the coin mechanism is in a reset condition and for releasing the dispensing mechanism when the coin mechanism is in a set condition.

19. Single newspaper vending machine, comprising:

a cabinet provided with a swingable front door mounted thereon, an elevator for supporting a stack of newspapers, means for advancing the elevator to an elevation at which the top newspaper in the stack is in a position to be dispensed, a gate unit including a dispensing mechanism reciprocable between rear and forward positions for contacting and advancing the top newspaper on the stack horizontally such that a portion of the paper enters a paper access zone during movement of the dispensing mechanism from the rear to the forward position, and a blocking mechanism operatively associated with said dispensing mechanism for preventing horizontal advance of a newspaper from the stack when the dispensing mechanism is in the rear position, said blocking mechanism including a blocking member biased to a position wherein the member blocks horizontal advance of a newspaper, and a latch spaced from said dispensing mechanism for capturing said blocking member in said position, said dispensing mechanism including means for moving said latch as said dispensing mechanism moves from said rear position to said forward position so as to free said blocking member and for yieldingly displacing the freed blocking member so as to clear a path for the newspaper being advanced by the dispensing mechanism to the paper access zone, a paper display unit disposed behind the front door for housing a display newspaper, a movable paper support unit disposed below the gate unit and mounted in telescoping relation to said paper display unit, and means for adjusting the elevation of said movable paper support unit so as to adjust the spacing between said gate unit and said movable paper support unit, said spacing defining the height of said paper access zone.

20. Single newspaper vending maching according to claim 19 including a coin mechanism, and a dispensing mechanism latch operatively associated with the coin mechanism for locking the dispensing mechanism in the rear position when the coin mechanism is in a reset condition and for releasing the dispensing mechanism when the coin mechanism is in a set condition.

21. Single newspaper vending machine according to claim 20 wherein said dispensing mechanism latch includes a carriage reciprocable in tandem with said dispensing mechanism, and means operatively associated with said carriage for resetting said coin mechanism.

22. Single newspaper vending machine according to claim 19 wherein said means for advancing said elevator includes a pair of springs, plural pulleys, plural cables secured to the elevator, each cable being wrapped on an associated pulley and secured to one of said springs such that the cables secured on one side of the elevator are coupled to one spring and the cables secured to the other side of the elevator are coupled to the other spring.

23. Single newspaper vending machine according to claim 19 wherein said means for advancing said elevator includes at least a pair of springs associated with opposite sides of said elevator, and an adjustment mechanism coupled to said elevator and said springs for equalizing the tension on said springs.

24. Single newspaper vending machine according to claim 19 including a further blocking mechanism disposed forward of the elevator and adapted and arranged to be contacted and displaced yieldingly by said top paper as the top paper is being advanced to said paper access zone from an initial position obstructing access to the paper stack to a clearance position and to return to said initial position and thereby prevent access to said paper stack when the top paper is withdrawn from contact therewith.

* * * * *